US009552537B2

(12) United States Patent
Shimada

(10) Patent No.: US 9,552,537 B2
(45) Date of Patent: Jan. 24, 2017

(54) COLOR CONVERSION METHOD AND PROFILE GENERATION METHOD

(71) Applicant: CANON KABUSHIKI KAISHA, Tokyo (JP)

(72) Inventor: Takuya Shimada, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/468,275

(22) Filed: Aug. 25, 2014

(65) Prior Publication Data

US 2014/0362391 A1 Dec. 11, 2014

Related U.S. Application Data

(63) Continuation of application No. 12/796,586, filed on Jun. 8, 2010, now Pat. No. 8,842,349, which is a
(Continued)

(30) Foreign Application Priority Data

Feb. 5, 2003 (JP) .................................. 2003-028668

(51) Int. Cl.
*G03F 3/08* (2006.01)
*G06K 15/02* (2006.01)
(Continued)

(52) U.S. Cl.
CPC .......... *G06K 15/1878* (2013.01); *H04N 1/465* (2013.01); *H04N 1/603* (2013.01); *H04N 1/608* (2013.01); *H04N 1/6077* (2013.01)

(58) Field of Classification Search
None
See application file for complete search history.

(56) References Cited

U.S. PATENT DOCUMENTS 5,297,058 A 3/1994 Samworth
5,377,024 A 12/1994 Dillinger
(Continued)

FOREIGN PATENT DOCUMENTS

JP 4-156780 5/1992
JP 10-136213 5/1998
(Continued)

OTHER PUBLICATIONS

European Search Report dated Apr. 22, 2009 in counterpart European Application No. 04708056.9.

*Primary Examiner* — Dung Tran
(74) *Attorney, Agent, or Firm* — Fitzpatrick, Cella, Harper & Scinto

(57) ABSTRACT

A tincture adjustment value used to adjust a monochrome signal to a tincture desired by a user is set, and a tincture conversion table and chromaticity line table are generated based on that tincture adjustment value and the profile of an image output apparatus. Using the generated tables, a lightness signal L* corresponding to an input monochrome signal is converted into a distance signal l on a chromaticity line, and the distance signal l is converted into a chromaticity signal (a*, b*). The lightness signal L* and chromaticity signal (a*, b*) are converted into a color signal of the image output apparatus.

7 Claims, 27 Drawing Sheets

Related U.S. Application Data continuation of application No. 10/531,062, filed as application No. PCT/JP2004/001145 on Feb. 4, 2004, now Pat. No. 7,755,795.

(51) Int. Cl.
*H04N 1/46* (2006.01)
*H04N 1/60* (2006.01)

(56) References Cited

U.S. PATENT DOCUMENTS

| | | | |
|---|---|---|---|
| 5,568,284 A | 10/1996 | Oku et al. | |
| 5,907,415 A | 5/1999 | Yabe | |
| 6,008,907 A | 12/1999 | Vigneau et al. | |
| 6,172,681 B1 | 1/2001 | Ueda | |
| 6,204,940 B1 | 3/2001 | Lin et al. | |
| 6,351,320 B1 | 2/2002 | Shin | |
| 6,359,703 B1 | 3/2002 | Yabe | |
| 6,519,049 B1 | 2/2003 | Nagasaka | |
| 6,664,973 B1 | 12/2003 | Iwamoto et al. | |
| 6,701,011 B1 | 3/2004 | Nakajima | |
| 6,792,160 B2 | 9/2004 | Shaw et al. | |
| 6,798,536 B1 | 9/2004 | Muramoto | |
| 7,019,867 B2 | 3/2006 | Kuwata et al. | |
| 7,230,737 B1 | 6/2007 | Ohga | |
| 7,239,402 B2 * | 7/2007 | Soler et al. | 358/1.13 |
| 7,277,200 B2 | 10/2007 | Ohga | |
| 7,330,287 B2 | 2/2008 | Sharman | |
| 7,345,798 B2 | 3/2008 | Kondo | |
| 7,369,285 B2 | 5/2008 | Morikawa | |
| 7,394,565 B2 | 7/2008 | Stokes et al. | |
| 7,397,572 B1 | 7/2008 | Horii | |
| 7,483,187 B2 | 1/2009 | Bochkarev | |
| 7,599,096 B2 | 10/2009 | Yoshida | |
| 7,636,178 B2 | 12/2009 | Nakatani et al. | |
| 9,047,555 B2 * | 6/2015 | Kishino | G06K 15/1878 |
| 2003/0038870 A1 | 2/2003 | Shimada | |
| 2004/0227977 A1 | 11/2004 | Yoshida | |
| 2006/0066928 A1 * | 3/2006 | Katou | H04N 1/6077 358/518 |
| 2006/0170939 A1 | 8/2006 | Misumi | |
| 2007/0139676 A1 | 6/2007 | Shimada | |
| 2007/0171440 A1 | 7/2007 | Yoshida | |

FOREIGN PATENT DOCUMENTS

| | | |
|---|---|---|
| JP | 11-45325 | 2/1999 |
| JP | 11-355584 | 12/1999 |
| JP | 2000-13628 A | 1/2000 |
| JP | 2001-086353 | 3/2001 |
| JP | 2002-142121 | 5/2002 |
| WO | 92-04800 A1 | 3/1992 |
| WO | 99-20036 A1 | 4/1999 |

* cited by examiner

FIG. 5

| GL | L* |
|---|---|
| 0 | xx.x |
| 16 | xx.x |
| 32 | xx.x |
| . | . |
| . | . |
| . | . |
| . | . |
| . | . |
| 255 | xx.x |

FIG. 7

| L* | I |
|---|---|
| xx.x | xx.x |
| xx.x | xx.x |
| xx.x | xx.x |
| . | . |
| . | . |
| . | . |
| . | . |
| . | . |
| xx.x | 0.0 |

F I G. 10

| I | a* | b* |
|---|---|---|
| 0 | x.x | x.x |
| 0.2 | x.x | x.x |
| 0.4 | x.x | x.x |
| . | . | . |
| . | . | . |
| . | . | . |
| . | . | . |
| . | . | . |
| x.x | x.x | x.x |

FIG. 15

| R | G | B | L* | a* | b* |
|---|---|---|----|----|----|
| 0 | 0 | 0 | x.x | x.x | x.x |
| 0 | 0 | 16 | x.x | x.x | x.x |
| . | . | . | . | . | . |
| 0 | 0 | 255 | x.x | x.x | x.x |
| 0 | 16 | 0 | . | . | . |
| . | . | . | . | . | . |
| . | . | . | . | . | . |
| 255 | 255 | 255 | x.x | x.x | x.x |

FIG. 22

| R | G | B | L* | a* | b* |
|---|---|---|----|----|----|
| 0 | 0 | 0 | x.x | x.x | x.x |
| 0 | 0 | 16 | x.x | x.x | x.x |
| . | . | . | x.x | x.x | x.x |
| 0 | 0 | 255 | | | |
| 0 | 16 | 0 | | | |
| . | . | . | | | |
| . | . | . | | | |
| 255 | 255 | 255 | x.x | x.x | x.x |

FIG. 23

| R | G | B | C | M | Y | K |
|---|---|---|---|---|---|---|
| 0 | 0 | 0 | x.x | x.x | x.x | x.x |
| 0 | 0 | 16 | x.x | x.x | x.x | x.x |
| · | · | · | x.x | x.x | x.x | x.x |
| 0 | 0 | 255 | · | · | · | · |
| 0 | 16 | 0 | · | · | · | · |
| · | · | · | · | · | · | · |
| · | · | · | · | · | · | · |
| · | · | · | · | · | · | · |
| 255 | 255 | 255 | x.x | x.x | x.x | x.x |

F I G. 26
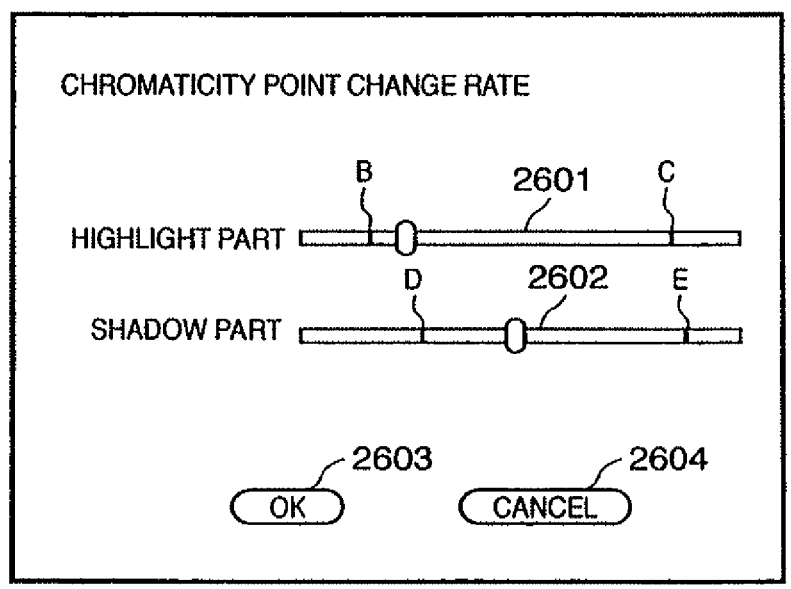

COLOR CONVERSION METHOD AND PROFILE GENERATION METHOD

This application is a continuation of U.S. patent application No. 12/796,586, filed Jun 8, 2010, which is a continuation of U.S. patent application No. 10/531,062, now U.S. Pat. No. 7,755,795, which was the National Stage of International Application No. PCT/JP2004/001145, filed Feb. 4, 2004. The contents of each of the foregoing applications are incorporated by reference herein.

TECHNICAL FIELD

The present invention relates to a technique for converting an input monochrome signal into color signals of an image output apparatus.

BACKGROUND ART

In recent years, use of digital color images has increased abruptly along with the popularization of digital cameras. Photo print techniques for satisfactorily printing these images have been extensively developed. On the other hand, in the field of silver halide photos, it has been prevalent to take monochrome photos using vintage cameras. Monochrome photos, unlike color photos, express an object's texture by subtle flavor and expressive power, are used as an expressive means different from that of color photos. Digital monochrome images are not so currently prevalent compared to color photos. If digital cameras are used as the same expression means as monochrome photos in the future, however, expansion of the usage of digital monochrome images are expected.

In general, a monochrome image is printed by forming an image using a black color agent (ink or toner). When an image is formed using a black color agent alone, however, the color characteristics of the black color agent practically determine the tincture of a printed image. Hence, the tincture of a printed image cannot be controlled in order to be reproduced desirably.

A monochrome image is also often formed by a so-called "composite black", using color agents such as, inter alia, cyan (hereinafter abbreviated as C), magenta (hereinafter abbreviated as M), yellow (hereinafter abbreviated as Y), in addition to black (hereinafter abbreviated as K). In these cases, by combining color agents at an appropriate ratio, the tincture of a monochrome image can be desirably reproduced. Also, by changing the ratio of combined color agents, the tincture can be adjusted.

Furthermore, when a color printer is used to print a monochrome image, the tincture cannot be adjusted unless the printer has a special adjustment function. Hence, when a monochrome image is outputted with a desired tincture, image data is converted into R, G, and B color component signals, which are to be adjusted.

In the above prior art, however, when the tincture is adjusted by adjusting the color agent amounts or color component signal values, because the relationship between the adjustment amounts and print colors is not always constant, an unexpected adjustment result is often obtained. Some adjustment may also lose a tincture balance at a specific gray level, and the tincture may disproportionately appear. For example, when a tinge of yellow is to be enhanced by increasing the amount of a Y color agent or decreasing a B signal value, the tincture of middle lightness has nearly no change, but an image with excessively yellowish highlight may be formed. Furthermore, some adjustment may often change the brightness of an image.

DISCLOSURE OF INVENTION

The present invention has been made to solve the aforementioned problems, and has as its object to generate a profile used to print a monochrome image with a tincture of user's choice without any color deviation.

It is another object of the present invention to convert monochrome image data into color image data that can be printed with a desired tincture without biasing colors upon printing the monochrome image data by a designated image output apparatus.

In order to achieve the above objects, according to one aspect of the present invention, there is provided a color conversion method for converting an input monochrome signal into a color signal on a predetermined color space, comprising: a setting step of setting a tincture adjustment value used to adjust the input monochrome signal to a desired tincture of a user; an acquisition step of acquiring color reproduction characteristics which depend on an image output apparatus and a recording medium; a first conversion step of converting the input monochrome signal into a first color signal using the color reproduction characteristics acquired in the acquisition step; a second conversion step of converting the first color signal converted in the first conversion step into a second color signal using the tincture adjustment value set in the setting step and the color reproduction characteristics acquired in the acquisition step; a third conversion step of converting the second color signal converted in the second conversion step into a third color signal; and an output step of forming and outputting a color signal on the color space on the basis of the third color signal converted in the third conversion step and the first color signal converted in the first conversion step.

According to one aspect of the present invention, there is provided a profile generation method for generating a profile which stores a relationship between monochrome signals and color signals on a predetermined color space, comprising: a setting step of setting a tincture adjustment value used to adjust monochrome signals to a desired tincture of a user; an acquisition step of acquiring color reproduction characteristics which depend on an image output apparatus and a recording medium; a generation step of generating discrete monochrome signals; a first conversion step of converting the monochrome signals generated in the generation step into first color signals using the color reproduction characteristics acquired in the acquisition step; a second conversion step of converting the first color signals converted in the first conversion step into second color signals using the tincture adjustment value set in the setting step and the color reproduction characteristics acquired in the acquisition step; a third conversion step of converting the second color signals converted in the second conversion step into third color signals; and a profile generation step of generating a profile on the basis of the third color signals converted in the third conversion step and the first color signals converted in the first conversion step.

According to one aspect of the present invention, there is provided an image conversion method for converting input monochrome image data into color image data for an image output apparatus designated by a user, comprising: a setting step of setting a tincture adjustment value used to adjust the input monochrome image data to a desired tincture of a user; an acquisition step of acquiring color reproduction characteristics which depend on the image output apparatus and a recording medium; a first conversion step of converting monochrome signals which form the input monochrome image data into first color signals using the color reproduction characteristics acquired in the acquisition step; a second conversion step of converting the first color signals converted in the first conversion step into second color signals using the tincture adjustment value set in the setting step and the color reproduction characteristics acquired in the acquisition step; a third conversion step of converting the second color signals converted in the second conversion step into third color signals; and a conversion step of converting the third color signals converted in the third conversion step and the first color signals converted in the first conversion step into color image data for the image output apparatus, and outputting the color image data.

According to one aspect of the present invention, there is provided an image processing apparatus for converting an input monochrome signal into a color signal on a predetermined color space, and outputting the color signal, comprising: setting means for setting a tincture adjustment value used to adjust the input monochrome signal to a desired tincture of a user; acquisition means for acquiring color reproduction characteristics which depend on an image output apparatus and a recording medium; first conversion means for converting the input monochrome signal into a first color signal using the color reproduction characteristics acquired by the acquisition means; second conversion means for converting the first color signal converted by the first conversion means into a second color signal using the tincture adjustment value set by the setting means and the color reproduction characteristics acquired by the acquisition means; third conversion means for converting the second color signal converted by the second conversion means into a third color signal; and output means for forming and outputting a color signal on the color space on the basis of the third color signal converted by the third conversion means and the first color signal converted by the first conversion means.

According to one aspect of the present invention, there is provided an image processing apparatus for generating a profile which stores a relationship between monochrome signals and color signals on a predetermined color space, comprising: setting means for setting a tincture adjustment value used to adjust monochrome signals to a desired tincture of a user; acquisition means for acquiring color reproduction characteristics which depend on an image output apparatus and a recording medium; generation means for generating discrete monochrome signals; first conversion means for converting the monochrome signals generated by the generation means into first color signals using the color reproduction characteristics acquired by the acquisition means; second conversion means for converting the first color signals converted by the first conversion means into second color signals using the tincture adjustment value set by the setting means and the color reproduction characteristics acquired by the acquisition means; third conversion means for converting the second color signals converted by the second conversion means into third color signals; and profile generation means for generating a profile on the basis of the third color signals converted by the third conversion means and the first color signals converted by the first conversion means.

According to one aspect of the present invention, there is provided an image processing apparatus for converting input monochrome image data into color image data for an image output apparatus designated by a user, and outputting the color image data, comprising: setting means for setting a tincture adjustment value used to adjust the input monochrome image data to a desired tincture of a user; acquisition means for acquiring color reproduction characteristics which depend on the image output apparatus and a recording medium; first conversion means for converting monochrome signals which form the input monochrome image data into first color signals using the color reproduction characteristics acquired by the acquisition means; second conversion means for converting the first color signals converted by the first conversion means into second color signals using the tincture adjustment value set by the setting means and the color reproduction characteristics acquired by the acquisition means; third conversion means for converting the second color signals converted by the second conversion means into third color signals; and conversion means for converting the third color signals converted by the third conversion means and the first color signals converted by the first conversion means into color image data for the image output apparatus, and outputting the color image data.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

FIG. 5 shows an example of grayscale characteristics stored in a grayscale characteristic holding module 408;

FIG. 7 shows an example of a tincture conversion table stored in a tincture conversion table holding module 409;

FIG. 10 shows an example of a chromaticity line table stored in a chromaticity line table holding module 410;

FIG. 15 shows an example of an output profile stored in an output profile holding module 1410;

FIG. 22 shows an example of an output profile stored in an output profile holding module 2110;

FIG. 23 shows an example of a color separation LUT stored in a color separation LUT holding module 2111;

FIG. 26 shows an example of a UI used to set a change rate of a chromaticity point in a modification.

BEST MODE FOR CARRYING OUT THE INVENTION

Preferred embodiments of the present invention will be described in detail hereinafter with reference to the accompanying drawings.

[First Embodiment]

The first embodiment will exemplify an image processing apparatus which generates a profile used to print an input monochrome image in a desired color without any tincture deviation in a print process using a color management system (hereinafter referred to as a CMS).

<CMS>

Figure 1:
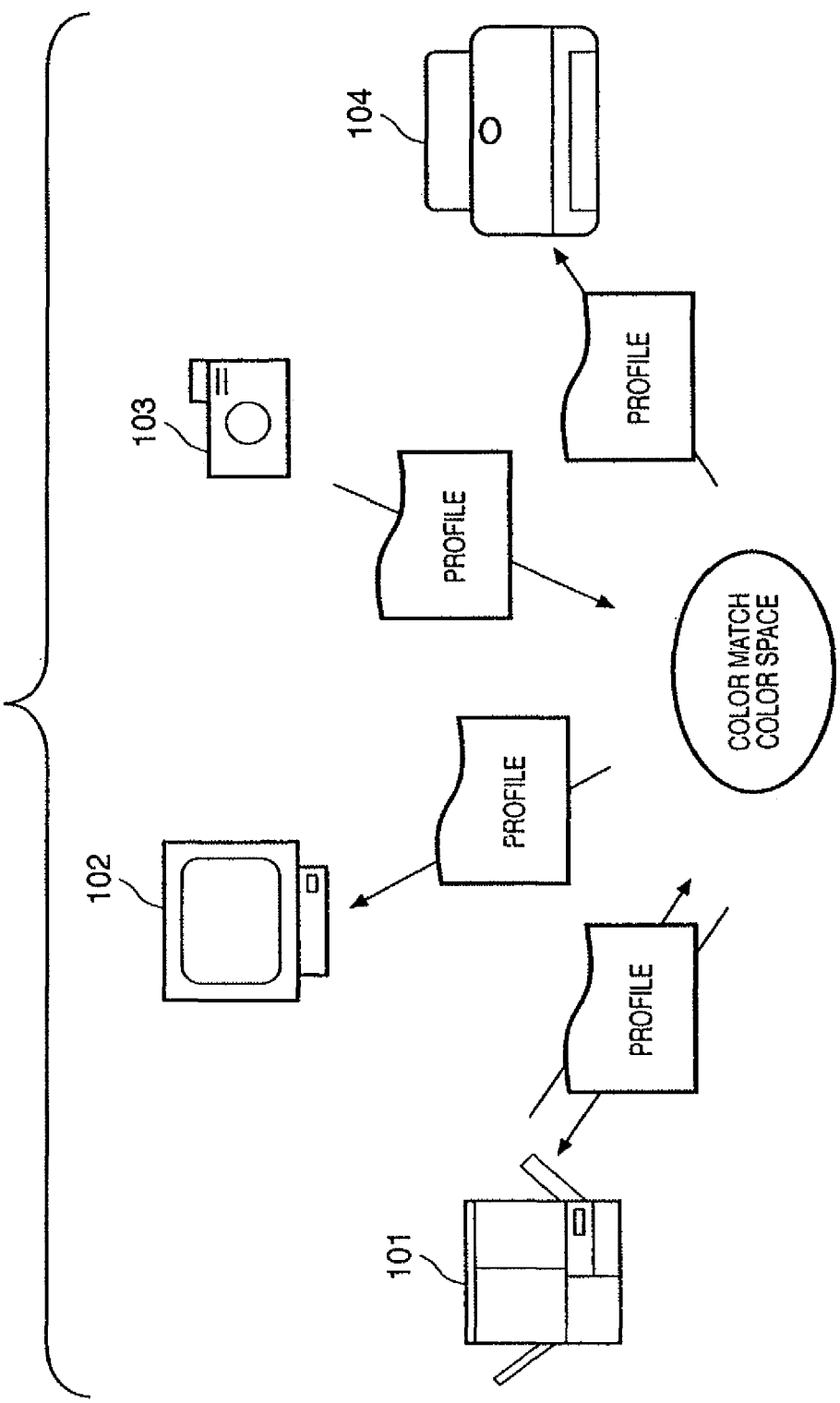
FIG. 1 is a view for explaining an overview of a color management system (CMS)

FIG. 1 is a view for explaining an overview of the CMS. The CMS is primarily a color processing technique that allows a plurality of image input/output apparatuses (e.g., a color copy 101, color monitor 102, digital camera 103, color printer 104, and the like) to satisfactorily reproduce an identical color image. According to the CMS, a color signal of an input system is converted into that of an output system. More specifically, an input color signal depending on an input system apparatus is converted into a signal on a color match color space, which is independent of any apparatuses using a predetermined conversion formula or table that pertains to the input system apparatus. The predetermined conversion formula or table used to mutually convert a signal on the color space depending on a given apparatus and a signal on the color match color space in this way is called a "profile" of that apparatus. The converted signal on the color match color space undergoes a predetermined color process to obtain a signal value to be output. The signal value is then converted into a signal on a color space depending on each apparatus of an output system with reference to a profile of that apparatus.

As described above, according to the CMS, because a color signal is converted between the color space depending on each apparatus and the color match color space, color matching among a plurality of apparatuses can be realized.

Figure 2:
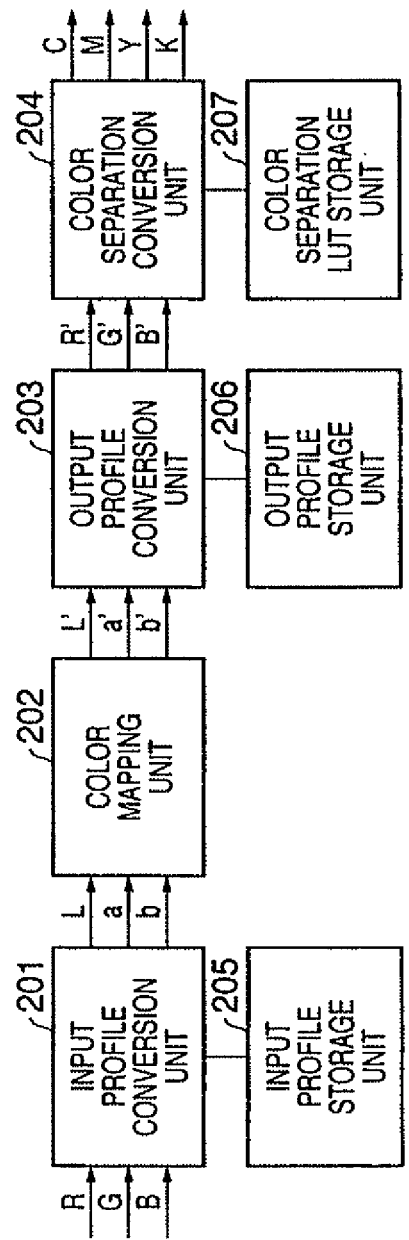
FIG. 2 is a block diagram showing an example of an image output system using a CMS.

FIG. 2 is a block diagram showing an example of an image output system using the CMS. In the image output system shown in FIG. 2, R, G, and B color signals that form image data are converted into C, M, Y, and K color signals of a connected image output apparatus by an input profile conversion unit 201, color mapping unit 202, output profile conversion unit 203, and color separation conversion unit 204.

The input profile conversion unit 201 converts input R, G, and B color signals into L*, a*, and b* color signals on a CIELAB color space on the basis of the profile which is stored in an input profile storage unit 205 and represents the color reproduction characteristics of an image input apparatus. The input profile storage unit 205 stores L*, a*, and b* color signals corresponding to discrete R, G, and B color signals as a three-dimensional (3D) lookup table (to be abbreviated as an LUT hereinafter). The input profile conversion unit 201 converts the input R, G, and B color signals into L*, a*, and b* color signals on the CIELAB color space by a known method using that 3D LUT.

The color mapping unit 202 converts L, a, and b input signals into L', a', and b' color signals which can be reproduced by the image output apparatus. In this way, when the image input apparatus and image output apparatus have different color gamuts, the color mapping unit 202 can absorb their differences. When the image input apparatus and image output apparatus have equal color gamuts, the input color signals are directly output.

The output profile conversion unit 203 converts input L', a', and b' color signals into R', G', and B' color signals depending on the image output apparatus on the basis of a profile which is stored in an output profile storage unit 206 and represents the color reproduction characteristics of the image output apparatus. Note that the output profile storage unit 206 typically stores L', a', and b' color signals corresponding to discrete R', G', and B' color signals as a 3D LUT. The output profile conversion unit 203 searches that 3D LUT for data near the input L', a', and b' color signals, and calculates output R', G', and B' color signals on the basis of the found data and the input color signals using a known interpolation method.

The color separation conversion unit 204 converts the input R', G', and B' color signal into output C, M, Y, and K color signals by a known method using a color separation LUT stored in a color separation LUT storage unit 207. Then, a print image corresponding to the input image data is formed by the image output apparatus (not shown) on the basis of the C, M, Y, and K color signals.

In this way, in the image output system using the aforementioned CMS, each of print colors corresponding to the input image data is determined by the input profile stored in the input profile storage unit 205. The image processing apparatus of the first embodiment generates an input profile used to print a monochrome image with a tincture of user's choice without any tincture deviation upon printing that monochrome image in the image output system using the CMS.

<Basic Arrangement>

Figure 3:
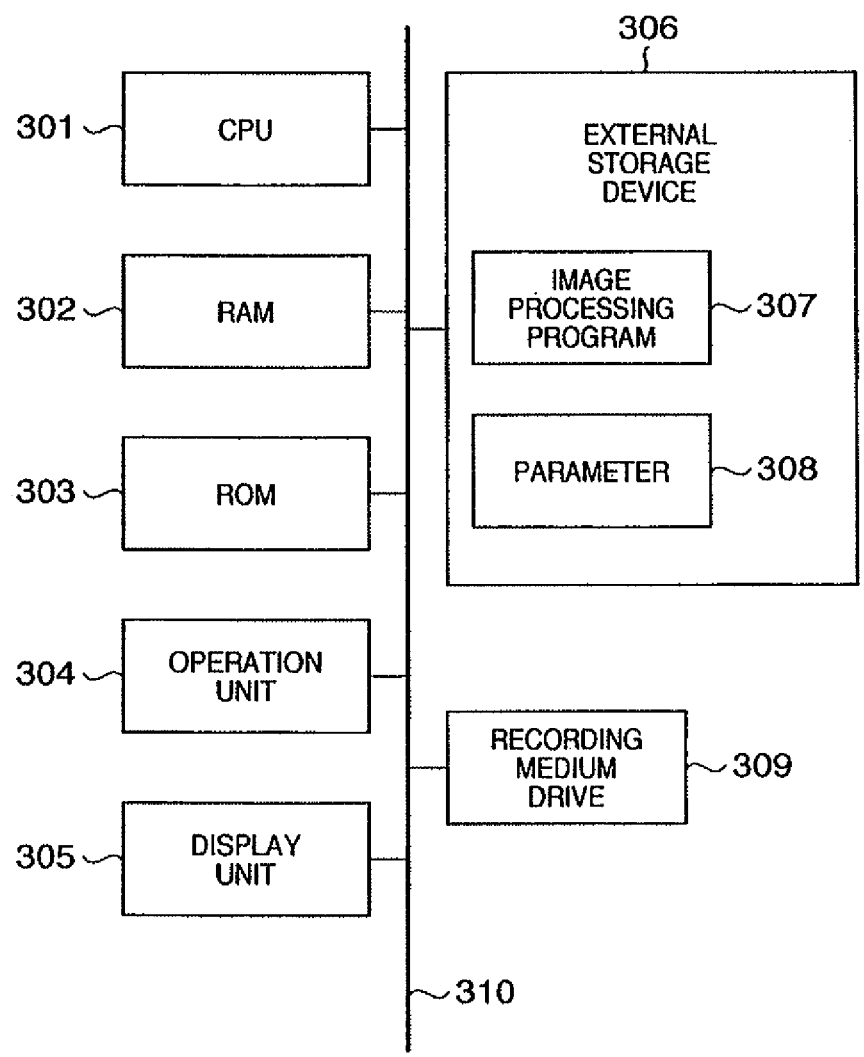
FIG. 3 is a block diagram showing the basic arrangement of an image processing apparatus in the first embodiment.

FIG. 3 is a block diagram showing the basic arrangement of the image processing apparatus in the first embodiment. Referring to FIG. 3, reference numeral 301 denotes a CPU, which controls the overall apparatus using programs and data stored in a RAM and ROM (to be described below), and also executes image processes (to be described later). Reference numeral 302 denotes a RAM which comprises an area for temporarily storing programs and data loaded from an external storage device or recording medium drive, and various data whose processes are underway, and also a work area used when the CPU 301 executes respective processes. Reference numeral 303 denotes a ROM which stores programs, control data, and the like required to control the overall apparatus.

Reference numeral 304 denotes an operation unit, which comprises a keyboard and a pointing device such as a mouse, and can input, among others, a gray tincture adjustment instruction, output profile designation, to this apparatus (to be described later). Reference numeral 305 denotes a display unit which comprises a CRT, liquid crystal display, etc, and displays various adjustment user interfaces (UIs; to be described later), images, and text. Reference numeral 306 denotes an external storage device which saves an operating system (OS), and an image processing program 307 and parameters 308 required to implement various image processes. Reference numeral 309 denotes a recording medium drive, which reads various data including image data from a recording medium, and outputs them to the external storage device 306 and RAM 302. Also, the storage medium drive 309 saves a generated profile. Reference numeral 310 denotes a bus which interconnects the aforementioned units.

<Functional Arrangement>

Figure 4:
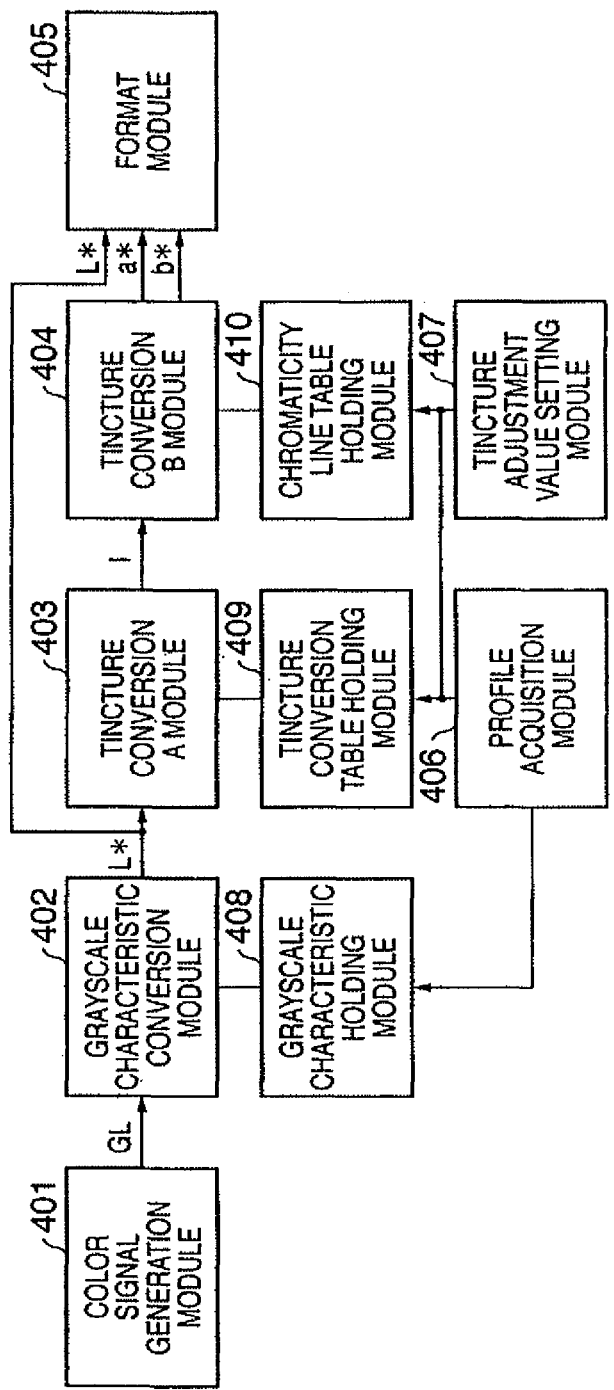
FIG. 4 is a block diagram showing the functional arrangement of the image processing apparatus in the first embodiment.

FIG. 4 is a block diagram showing the functional arrangement of the image processing apparatus in the first embodiment. As shown in FIG. 4, the apparatus comprises, as the functional arrangement, a color signal generation module 401, grayscale characteristic conversion module 402, tincture conversion A module 403, tincture conversion B module 404, format module 405, profile acquisition module 406, tincture adjustment value setting module 407, grayscale characteristic holding module 408, tincture conversion table holding module 409, and chromaticity line table holding module 410.

In this arrangement, the color signal generation module 401 generates discrete monochrome signals GL. The grayscale characteristic conversion module 402 converts the monochrome signals GL into print image lightness values L*, obtained when the monochrome signals GL are output by the image output apparatus on the basis of grayscale characteristics stored in the grayscale characteristic holding module 408.

Figure 5:
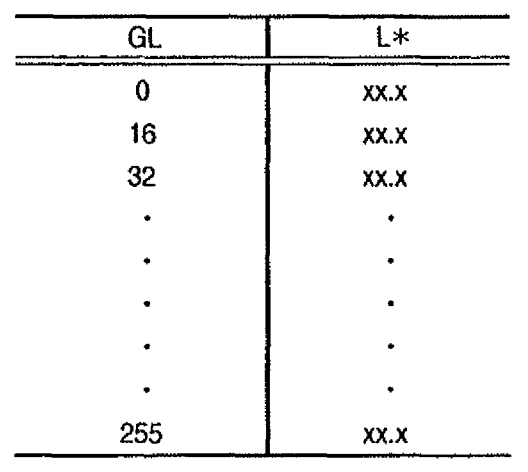

FIG. 5 shows an example of the grayscale characteristics stored in the grayscale characteristic holding module 408. The grayscale characteristics are stored as a correspondence table of lightness values L* in association with discrete monochrome signals GL, and are associated print image with brightness. Note that a lightness value L* corresponding to an arbitrary monochrome signal GL is calculated by a known interpolation operation on the basis of the grayscale characteristics.

Figure 6:
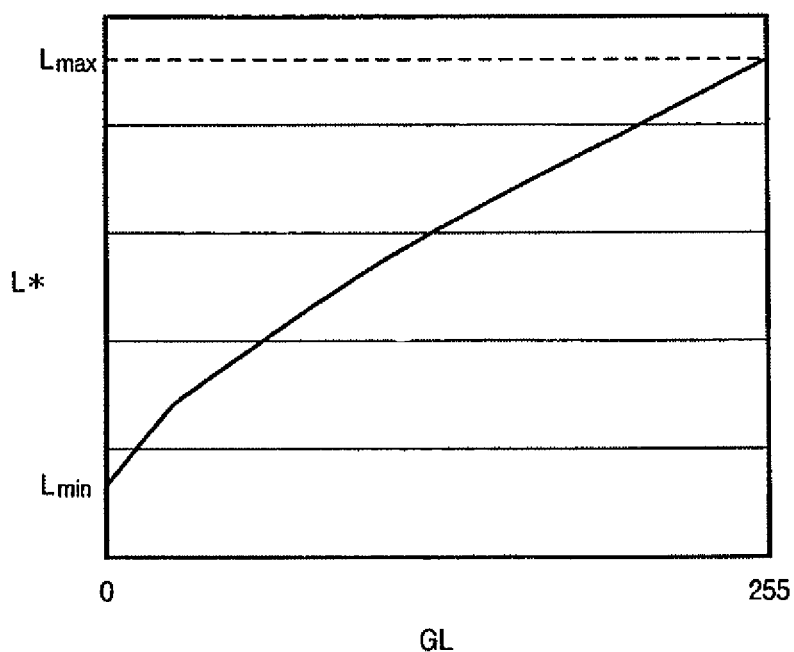
FIG. 6 shows an example of the relationship between a monochrome signal GL and lightness $L^*$.

FIG. 6 shows an example of the relationship between the monochrome signal GL and lightness L*. Referring to FIG. 6, the monochrome signal GL is an 8-bit signal. Lmax represents a lightness value L* which normally corresponds to a maximum value (to be referred to as a white signal hereinafter) GL=255 of the monochrome signal GL, and Lmin represents a lightness value L* which corresponds to a minimum value (to be referred to as a black signal) GL=0 of the monochrome signal GL. The values Lmax and Lmin are acquired by the profile acquisition module 406 (to be described later). A lightness value L* corresponding to a monochrome signal GL which meets 0<GL and GL<255 is preferably determined on the basis of the values Lmax and Lmin and desired grayscale characteristics.

The tincture conversion A module 403 converts each lightness value L* as an input signal into a distance signal l on a chromaticity space (to be described later) on the basis of a tincture conversion table stored in the tincture conversion table holding module 409.

Figure 7:
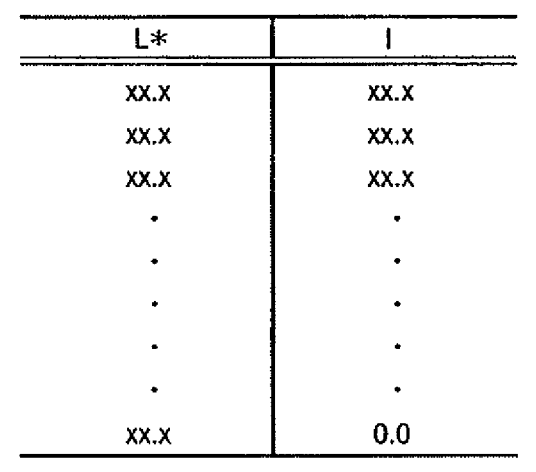

FIG. 7 shows an example of the tincture conversion table stored in the tincture conversion table holding module 409. This tincture conversion table is a correspondence table of distance signals l in association with discrete lightness values L*, and is associated with the tincture of a print image. A distance signal l corresponding to an arbitrary lightness value L* is calculated by a known interpolation operation on the basis of this tincture conversion table.

The distance signal l and a chromaticity point path (gray line) of the monochrome signal in the profile to be generated will be described in detail below using FIG. 8.

Figure 8:
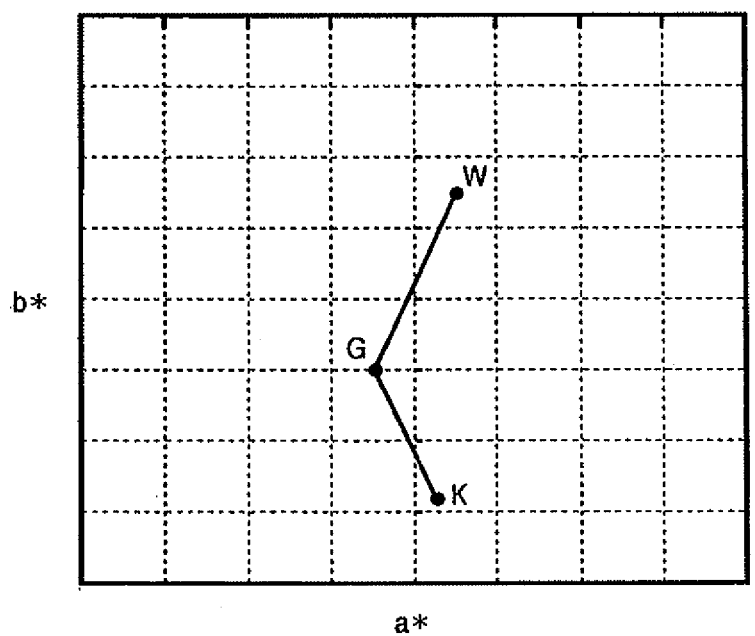
FIG. 8 illustrates a chromatic point path projected onto an $a^*b^*$ chromaticity plane on the CIELAB color space.

FIG. 8 illustrates the chromaticity point path projected onto an a*b* chromaticity plane on the CIELAB color space. Referring to FIG. 8, a point W is a chromaticity point of a print color (white print color) corresponding to the white signal, and a point K is a chromaticity point of a print color (black print color) corresponding to the black signal. The chromaticity points (points W and K) of white and black print colors are acquired by the profile acquisition module 406 (to be described later). A point G is a chromaticity point (gray chromaticity point) of a middle lightness value, which is designated by an adjustment instruction from the tincture adjustment value setting module 407 (to be described later).

When a profile is generated so that the gray line passes the gray chromaticity point (point G) designated by the adjustment instruction, as shown in FIG. 8, a monochrome print image with a tincture based on user's intention can be obtained.

This distance signal l indicates a distance along the gray line when the point W is a starting point, and a signal value corresponding to each chromaticity point on the gray line, as shown in FIG. 8. For example, a distance signal lg corresponding to the point G indicates a distance between the points W and G along the gray line, and a distance signal lk corresponding to the point K indicates the sum of the distance signal lg and a distance between the points G and K along the gray line. Also, a distance signal corresponding to the point W is zero.

Details of the tincture conversion process in the tincture conversion A module 403 shown in FIG. 4 will be described below using FIG. 9.

Figure 9:
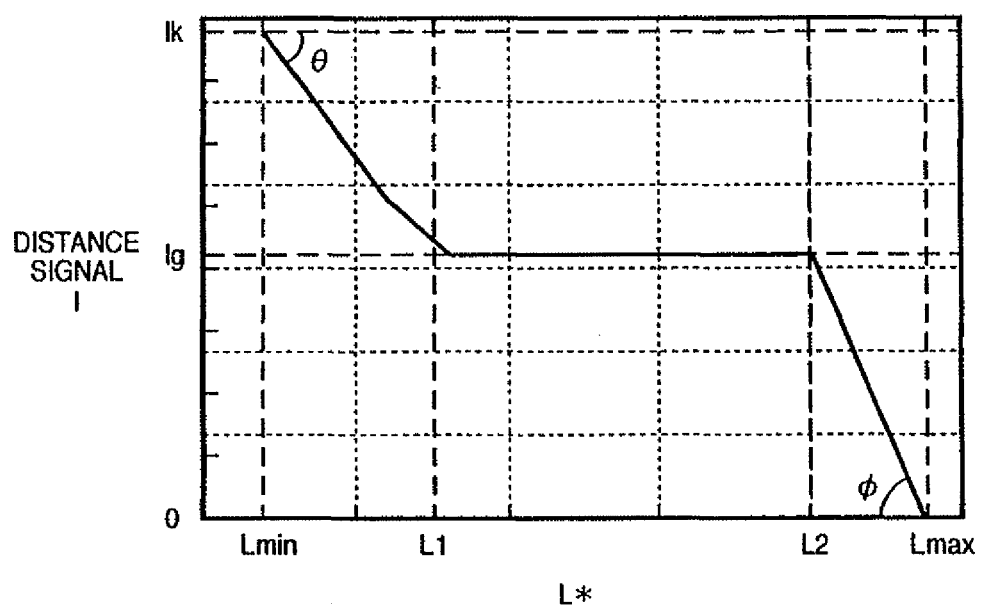
FIG. 9 shows an example of the relationship between lightness values $L^*$ and distance signals l, which form the tincture conversion table shown in FIG. 7.

FIG. 9 shows an example of the relationship between the lightness values L* and distance signals l, which form the tincture conversion table shown in FIG. 7. Referring to FIG. 9, lightness Lmin indicates the lightness value of the black print color. The chromaticity point of that black print color is the point K shown in FIG. 8, and a distance signal l corresponding to lightness Lmin is the distance signal lk in the above example. On the other hand, lightness Lmax is the lightness value of the white print color. The chromaticity point of that white print color is the point W shown in FIG. 8, and a distance signal l corresponding to lightness Lmax is zero, as described above. A distance signal l corresponding to a middle lightness part (L* that satisfies L1<L* and L*<L2 in FIG. 9) is the distance signal lg corresponding to the chromaticity point G shown in FIG. 8. In the first embodiment, by generating a profile so that the chromaticity point of the middle lightness part matches the gray chromaticity point (point G shown in FIG. 8) designated by the adjustment instruction, a monochrome print image with a tincture based on user's intention can be obtained.

Suppression of tincture changes in highlight and shadow parts will be described below using FIG. 9. Referring to FIG. 9, when the aforementioned middle lightness part has a broad lightness range (i.e., L2-L1 is large) most of input monochrome signals except for highlight and shadow are reproduced based on the chromaticity point (point G shown in FIG. 8) designated by the adjustment instruction. In this case, however, because the change rate of the distance signal 1 associated with lightness (i.e., that of the chromaticity point is large in a high lightness part near the white print color and a low lightness part near the black print color) tincture changes are observed in, among others, gradation images.

In the first embodiment, since the tincture adjustment value setting module 407 (to be described later) issues an adjustment instruction of the change rate of the chromaticity point, (1) and 0 (angles line segments indicated by the tincture conversion table and a straight line parallel to the L* axis make respectively in the high and low lightness parts) in FIG. 9 are appropriately set, thus generating a profile which suppresses tincture changes of a print image.

The tincture conversion B module 404 shown in FIG. 4 converts each distance signal 1 as an input signal into a chromaticity coordinate signal (a*, b*) on the CIELAB color space on the basis of a chromaticity line table stored in the chromaticity line table holding module 410.

Figure 10:
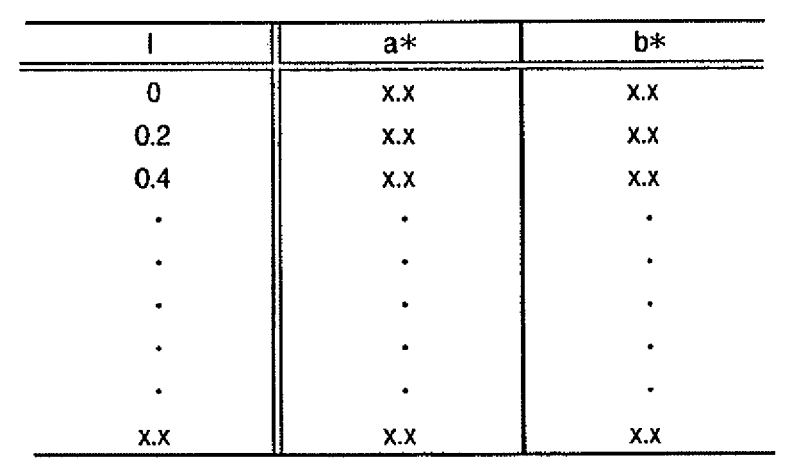

FIG. 10 shows an example of the chromaticity line table stored in the chromaticity line table holding module 410. This chromaticity line table is formed by extracting the relationship between distance signals 1 on the gray line shown in FIG. 8 and chromaticity coordinates (a*, b*) in association with discrete distance signals 1. A chromatic coordinate signal (a*, b*) corresponding to an arbitrary distance signal 1 is calculated by a known interpolation operation on the basis of this chromaticity line table.

The format module 405 converts the input L*, a*, and b* signals into a prescribed format, thus generating a profile. This profile is made up of a 3D LUT (L*, a*, and b* color signals corresponding to discrete R, G, and B color signals), and various kinds of header information. When R, G, and B color signals have equal color signal values (R=G=B), the 3D LUT stores L*, a*, and b* color signals on the basis of the outputs from the grayscale characteristic conversion module 402 and tincture conversion B module 404 when the color signal generation module 401 generates the corresponding monochrome color signals (GL=R=G=B). For other R, G, and B color signals, the 3D LUT stores dummy L*, a*, and b* color signals.

The profile acquisition module 406 acquires an output profile of the image output apparatus, and then acquires L*, a*, and b* color signals of white and black print colors, which depend on that image output apparatus and an image recording medium (print paper). The acquired L*, a*, and b* color signals of white and black print colors are used by the grayscale characteristic holding module 408 and the tincture adjustment value setting module 407 (to be described below).

The aforementioned tincture adjustment value setting module 407 sets the tincture conversion table to be stored in the tincture conversion table holding module 409 and the chromaticity line table to be stored in the chromaticity line table holding module 410 on the basis of the chromaticity points of the white and black print colors acquired by the profile acquisition module 406, and a gray chromaticity point (point G shown in FIG. 8) and chromaticity point change rate (values associates with ID and 0 shown in FIG. 9), which are set using the UIs to be described later.

The first embodiment can generate a profile required to obtain a monochrome print image with a tincture based on user's intention, since it comprises of means for setting the gray chromaticity point and chromaticity point change rate.

<UI>

Figure 11:
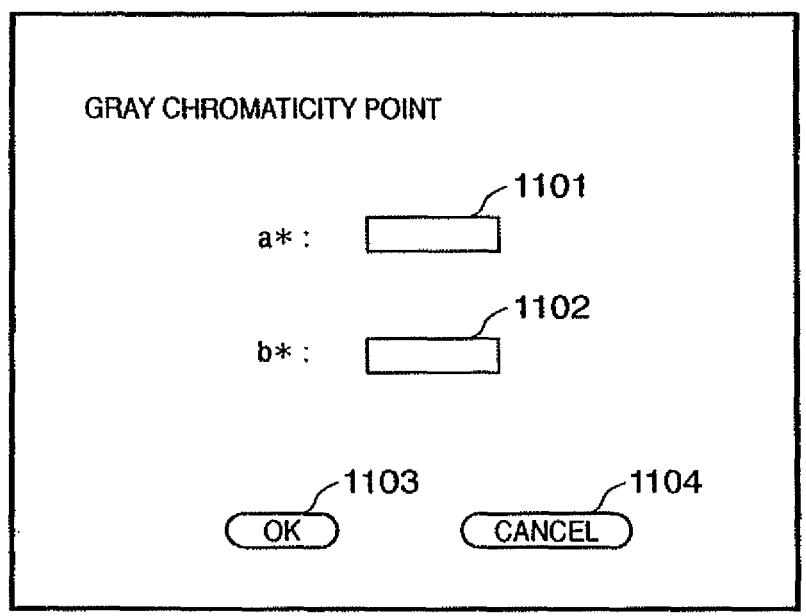
FIG. 11 shows an example of a UI used to set a gray chromaticity point.
Figure 12:
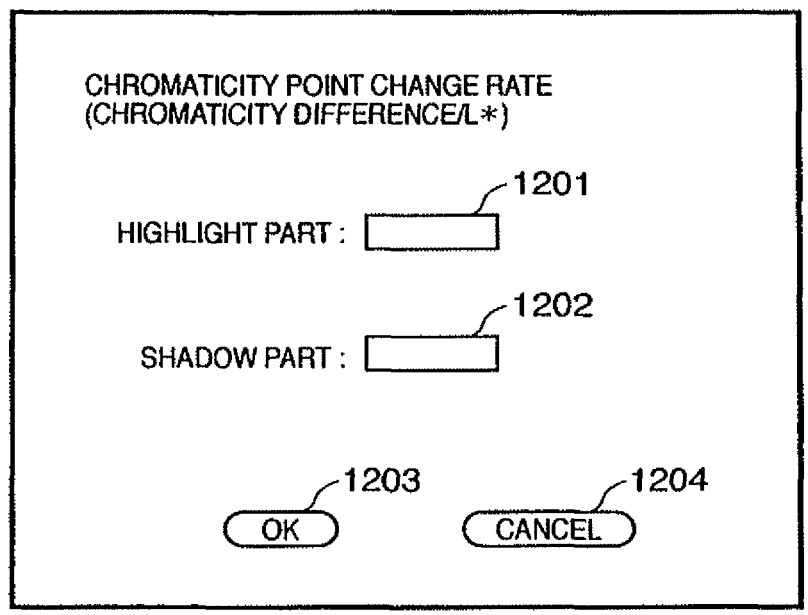
FIG. 12 shows an example of a UI used to a chromaticity point change rate.

FIGS. 11 and 12 show examples of tincture adjustment value setting user interfaces (UIs) in the first embodiment. FIG. 11 shows an example of a UI used to set the gray chromaticity point. As shown in FIG. 11, this UI includes a text box 1101 used to set an a* value of the CIELAB color space, a text box 1102 used to set a b* value, an OK button 1103, and a cancel button 1104. The a* and b* values of the gray chromaticity point corresponding to the point G shown in FIG. 8 are input to the text boxes 1101 and 1102. When the user selects the OK button 1103, the input chromaticity point is set, and the corresponding chromaticity line table and tincture conversion table are respectively stored in the chromaticity line table holding module 410 and tincture conversion table holding module 409. When the user selects the cancel button 1104, the setting values are canceled, and the chromaticity line table and tincture conversion table are not updated.

FIG. 12 shows an example of a UI used to set the chromaticity point change rate. As shown in FIG. 12, this UI includes a text box 1201 used to set a chromaticity change rate of a highlight part, a text box 1202 used to set a chromaticity change rate of a shadow part, an OK button 1203, and a cancel button 1204. A change rate per unit lightness (L*) of the aforementioned distance signal 1 is inputted into each text box. Let H_in be the value to be inputted into the text box 1201, and S_in be the value to be inputted into the text box 1202. Then, 4:13 and 0 shown in FIG. 9, and H_in and S_in respectively have the following relationships:

$$\Phi = \tan^{-1}(S\_in)$$

$$\theta = \tan^{-1}(H\_in)$$

When the user selects the OK button 1203, $\Phi$ and $\theta$ corresponding to the input values are set on the basis of the above equations, and the corresponding tincture conversion table is stored in the tincture conversion table holding module 409. On the other hand, when the user selects the cancel button 1204, setting values are canceled, and the tincture conversion table is not updated.

<Image Processing Sequence>

Figure 13:
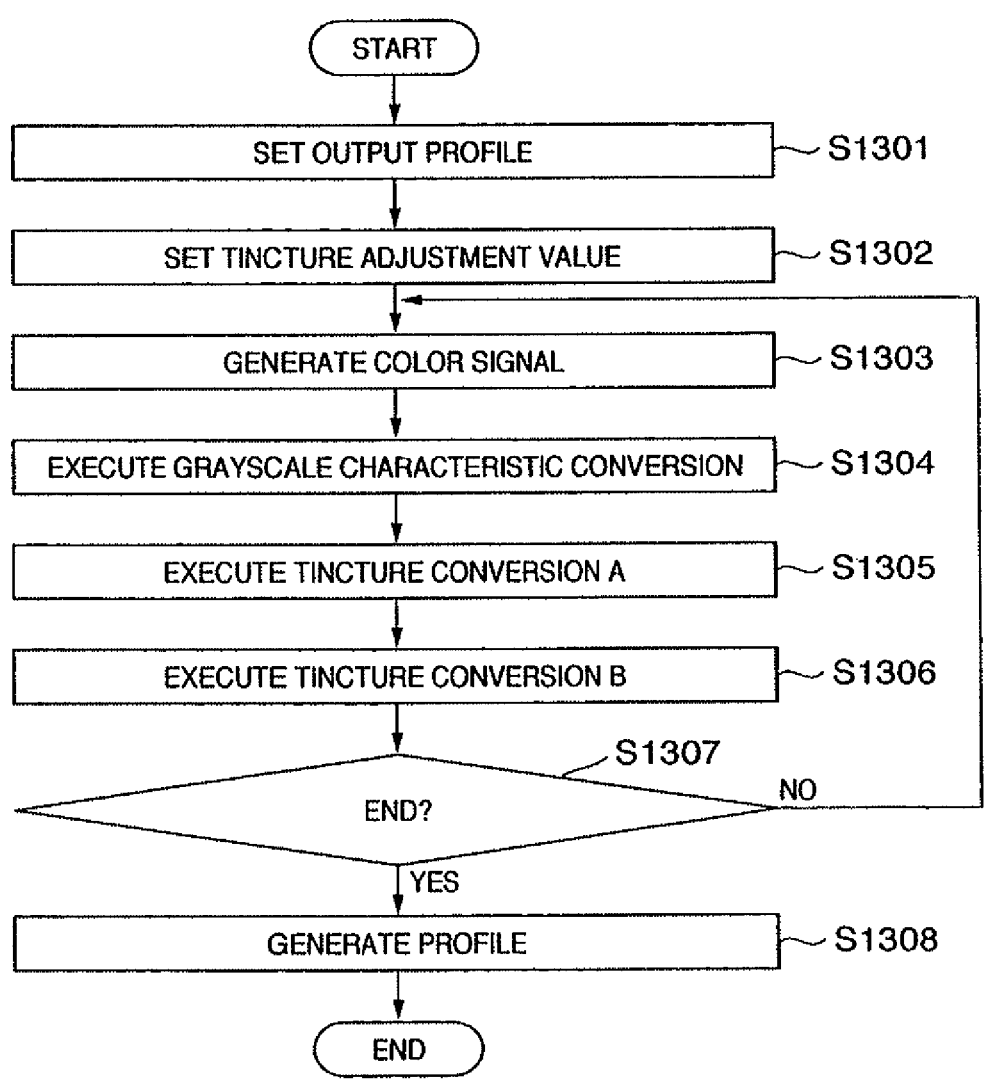
FIG. 13 is a flow chart showing the profile generation sequence in the first embodiment.

FIG. 13 is a flow chart showing the profile generation sequence in the first embodiment. This profile generation process is executed in the following sequence.

In step S1301, an output profile is set. In this output profile setting process, the output profile of the image output apparatus is acquired, and L*, a*, and b* color signals of white and black print colors, which depend on that image output apparatus and an image recording medium (print paper) are acquired. Furthermore, corresponding grayscale characteristics are stored in the aforementioned grayscale characteristic holding module 408 on the basis of the acquired L values of the white and black print colors. In step S1302, tincture adjustment values are set. In this tincture adjustment value setting process, a corresponding tincture conversion table and chromaticity line table are respectively stored in the aforementioned tincture conversion table holding module 409 and chromaticity line table holding module 410 on the basis of the image output apparatus and image recording medium (print paper or the like), and the gray chromaticity point and chromaticity point change rate set by the aforementioned tincture adjustment value setting module 407.

In step S1303, the aforementioned color signal generation module 401 generates a discrete monochrome signal GL which forms a 3D LUT to be stored in a profile. In step S1304, the aforementioned grayscale characteristic conversion module 402 converts the monochrome signal GL into a lightness value L*. In step S1305, the aforementioned tincture conversion A module 403 converts the lightness value L* into a distance function 1. In step S1306, the aforementioned tincture conversion B module 404 converts the distance function 1 into a chromaticity coordinate signal (a*, b*) on the CIELAB color space.

It is checked in step S1307 if the processes of all monochrome signals which form the 3D LUT of the profile are complete. If signals to be processed still remain, the flow returns to step S1303 to repeat the aforementioned processes. On the other hand, if it is determined in step S1307 that the processes of all signals are complete, the flow advances to step S1308, the aforementioned format module 405 forms a 3D LUT on the basis of the chromaticity coordinate signals (a*, b*) obtained in step S1306, and lightness values L* obtained in step S1304 generates a profile.

As described above, according to the first embodiment, a profile used to print a monochrome image to have a desired tincture and to be free from any tincture change in a print process using the CMS can be easily generated. More specifically, this embodiment comprises the means for setting the gray chromaticity point and chromaticity point change rate, and a profile is generated by determining a gray line on the basis of setting values. Using this profile, a monochrome print image with a tincture based on user's intention can be obtained.

[Second Embodiment]

The second embodiment of the present invention will be described in detail hereinafter with reference to the accompanying drawings.

An image processing apparatus of the second embodiment converts monochrome image data into color image data which can be printed with a desired tincture without any color deviation upon printing the monochrome image by a designated image output apparatus. Note that the basic arrangement of the image processing apparatus in the second embodiment is the same as that of the first embodiment explained using FIG. 3, and a description thereof will be omitted.

<Functional Arrangement>

Figure 14:
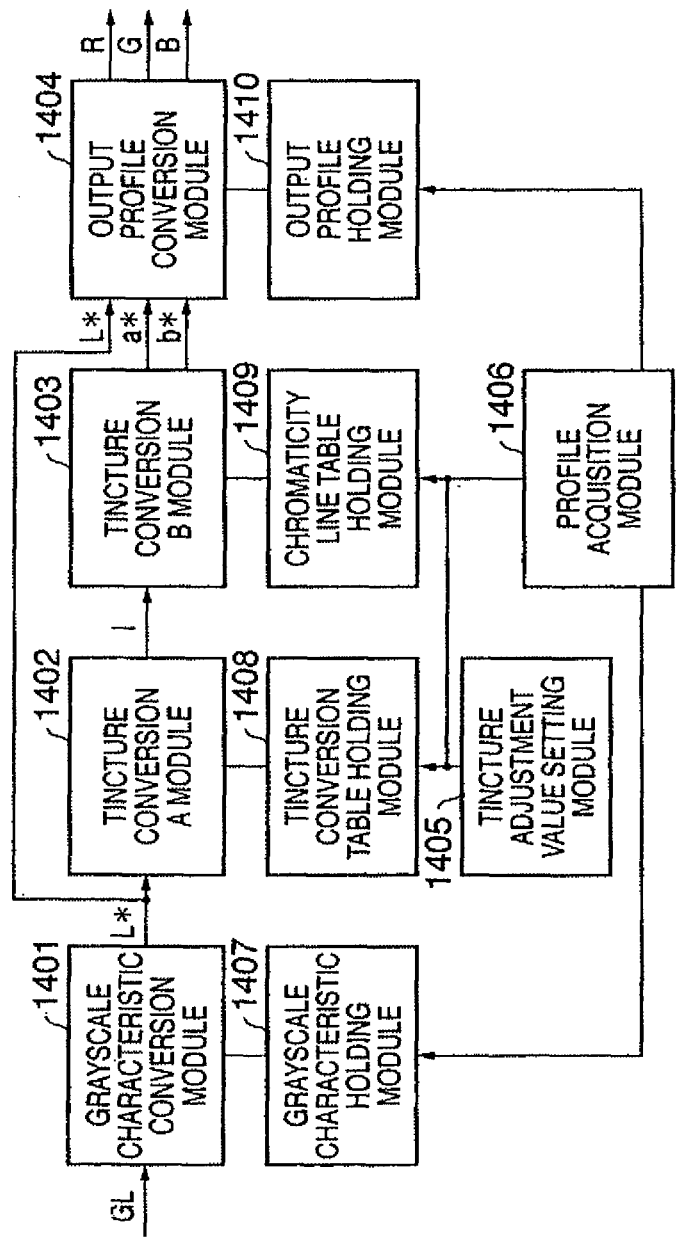
FIG. 14 is a block diagram showing the functional arrangement of an image processing apparatus in the second embodiment.

FIG. 14 is a block diagram showing the functional arrangement of the image processing apparatus in the second embodiment. As shown in FIG. 14, the apparatus comprises, as the functional arrangement, a grayscale characteristic conversion module 1401, tincture conversion A module 1402, tincture conversion B module 1403, output profile conversion module 1404, tincture adjustment value setting module 1405, profile acquisition module 1406, grayscale characteristic holding module 1407, tincture conversion table holding module 1408, chromaticity line table holding module 1409, and output profile holding module 1410.

In this arrangement, monochrome signals GL that form an input monochrome image are converted into R, G, and B color signals, which are required to print the input monochrome image with a desired tincture without any color deviation upon printing the monochrome image by a designated image output apparatus, by the grayscale characteristic conversion module 1401, tincture conversion A module 1402, tincture conversion B module 1403, and output profile conversion module 1404. Note that the aforementioned functional modules—except for the output profile conversion module 1404, profile acquisition module 1406, and output profile holding module 1410—have the same functions as those which have the same names in the first embodiment explained using FIG. 4, the description thereof will be omitted.

The output profile conversion module 1404 converts input L*, a*, and b* color signals into R, G, and B color signals depending on the designated image output apparatus on the basis of an output profile stored in the output profile holding module 1410. Note that the inputted L*, a*, and b* color signals are adjusted to have a desired tincture, and to obscure tincture changes, as has been explained in the first embodiment. For this reason, the image output apparatus can print the image data formed by the R, G, and B color signals as an image which has a desired tincture and inconspicuous tincture changes. Note that the output profile stored in the output profile holding module 1410 represents the color reproduction characteristics of the image output apparatus, and is acquired by the profile acquisition module 1406.

FIG. 15 shows an example of the output profile stored in the output profile holding module 1410. This output profile is a correspondence table, that is, a so-called 3D LUT of print colors (CIELAB values) in association with discrete R, G, and B color signals. The output profile conversion module 1404 searches this 3D LUT for data near the input L*, a*, and b* color signals, and calculates output R, G, and B color signals using a known interpolation method on the basis of the found data and the input signals.

The profile acquisition module 1406 acquires an output profile of the designated image output apparatus. This output profile is obtained by printing a color patch image of discrete R, G, and B color signals, which form the 3D LUT by the image output apparatus, and measuring the printed color patch image.

Figure 16:
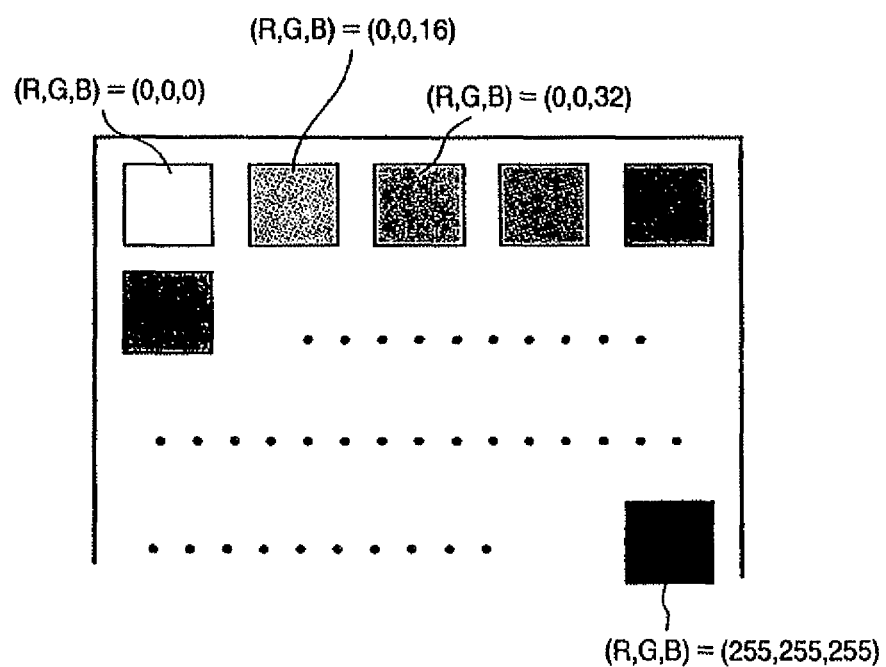
FIG. 16 shows an example of a color patch image in the second embodiment.

FIG. 16 shows an example of the color patch image in the second embodiment. The color patch image includes color patches of color signals, e.g., {R, G, B}={0, 0, 0}, {0, 0, 16}, ..., {0, 0, 255}, {0, 16, 0}, {0, 16, 16}, ..., {255, 255, 255}. The acquired profile is stored in the output profile holding module 1410, and L*, a*, and b* color signals (colorimetric values of {R, G, B}={255, 255, 255} and {0, 0, 0}) of white and black print colors are used in the grayscale characteristic holding module 1407 and tincture adjustment value setting module 1405.

<Image Processing Sequence>

Figure 17:
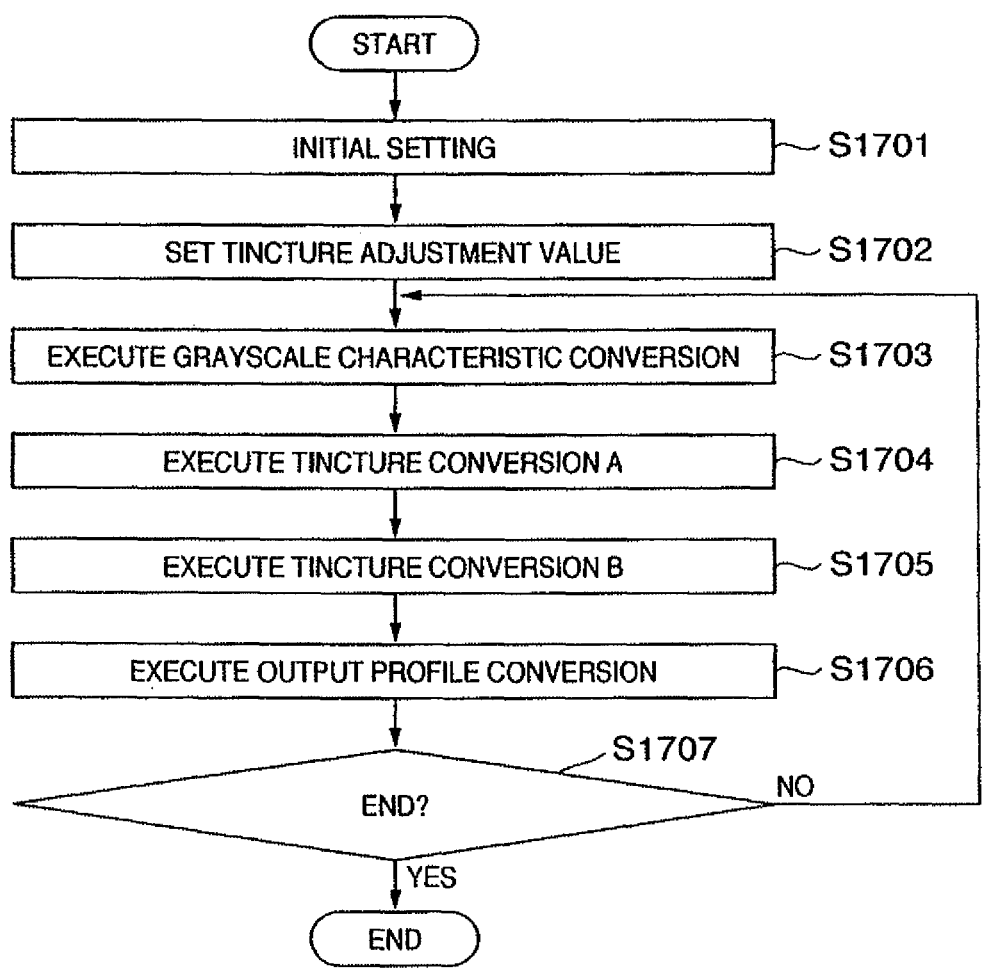
FIG. 17 is a flow chart showing the image processing sequence in the second embodiment.

FIG. 17 is a flow chart showing the image processing sequence in the second embodiment. This image process is done in the following sequence.

In step S1701, an initial setting process is made. In the initial setting process, a corresponding output profile is stored in the aforementioned output profile holding module 1410 in accordance with the designated image output apparatus and an image recording medium (print paper or the like). Also, an input monochrome image is set. In step S1702, tincture adjustment values are set. In this tincture adjustment value setting process, a corresponding tincture conversion table and chromaticity line table are respectively stored in the aforementioned tincture conversion table holding module 1408 and chromaticity line table holding module 1409 on the basis of the image output apparatus and image recording medium (print paper, etc), and the gray chromaticity point and chromaticity point change rate set by the aforementioned tincture adjustment value setting module 1405.

In step S1703, the aforementioned grayscale characteristic conversion module 1401 converts a monochrome signal GL which forms the input monochrome image into a lightness value L*. In step S1704, the aforementioned tincture conversion A module 1402 converts the lightness value L* into a distance function 1. In step S1705, the aforementioned tincture conversion B module 1403 converts the distance function 1 into a chromaticity coordinate signal (a*, b*) on the CIELAB color space. In step S1706, the aforementioned output profile conversion module 1404 calculates R, G, and B color signals depending on the image output apparatus on the basis of that chromaticity coordinate signal (a*, b*) and the lightness value L* obtained in step S1703.

It is checked in step S1707 if the processes of all monochrome signals which form the input monochrome image are complete. If signals to be processed still remain, the flow returns to step S1703 to repeat the aforementioned processes. On the other hand, if the processes of all signals are complete, this image process ends.

As described above, according to the second embodiment, monochrome image data can be converted into color image data which can be printed to have a desired tincture without any color deviation upon printing that monochrome image data by the image output apparatus.

[Modification of First and Second Embodiments]

In the first and second embodiments mentioned above, the tincture conversion A module (403 in FIG. 4, 1402 in FIG. 14) converts the lightness value L* converted by the grayscale characteristic conversion module (402 in FIG. 4, 1401 in FIG. 14) into a distance signal 1 on the gray line. Alternatively, the tincture conversion A module may convert a monochrome signal GL into a distance signal 1 without temporarily converting it into lightness L*.

Figure 18:
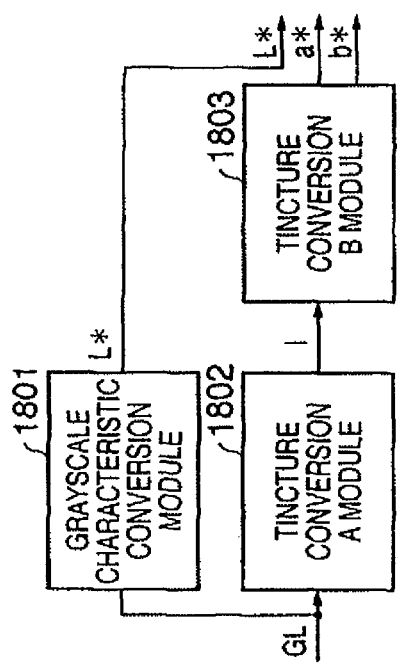
FIG. 18 is a block diagram partially showing the functional arrangement of the image processing apparatus in a modification of the first and second embodiments.

FIG. 18 is a block diagram partially showing the functional arrangement of the image processing apparatus in a modification of the first and second embodiments. Note that the functional modules other than a grayscale characteristic conversion module 1801, tincture conversion A module 1802, and tincture conversion B module 1803 are not shown in FIG. 18, and are the same as those in the first and second embodiments.

The tincture conversion A module 1802 in this modification converts a monochrome signal GL which forms an input monochrome image into a distance signal 1. This conversion process converts the monochrome signal on the basis of a table as a correspondence table of distance signals 1 in association with discrete monochrome signals GL, in the same manner as in the first and second embodiments.

[Third Embodiment]

The third embodiment of the present invention will be described in detail below with reference to the accompanying drawings.

An image processing apparatus of the third embodiment converts color signals that form an input monochrome image into those for a connected image output apparatus, and converts them into color signals, which allow the image output apparatus to print a monochrome image with a desired tincture without any color deviation.

<Arrangement with Peripheral Devices>

Figure 19:
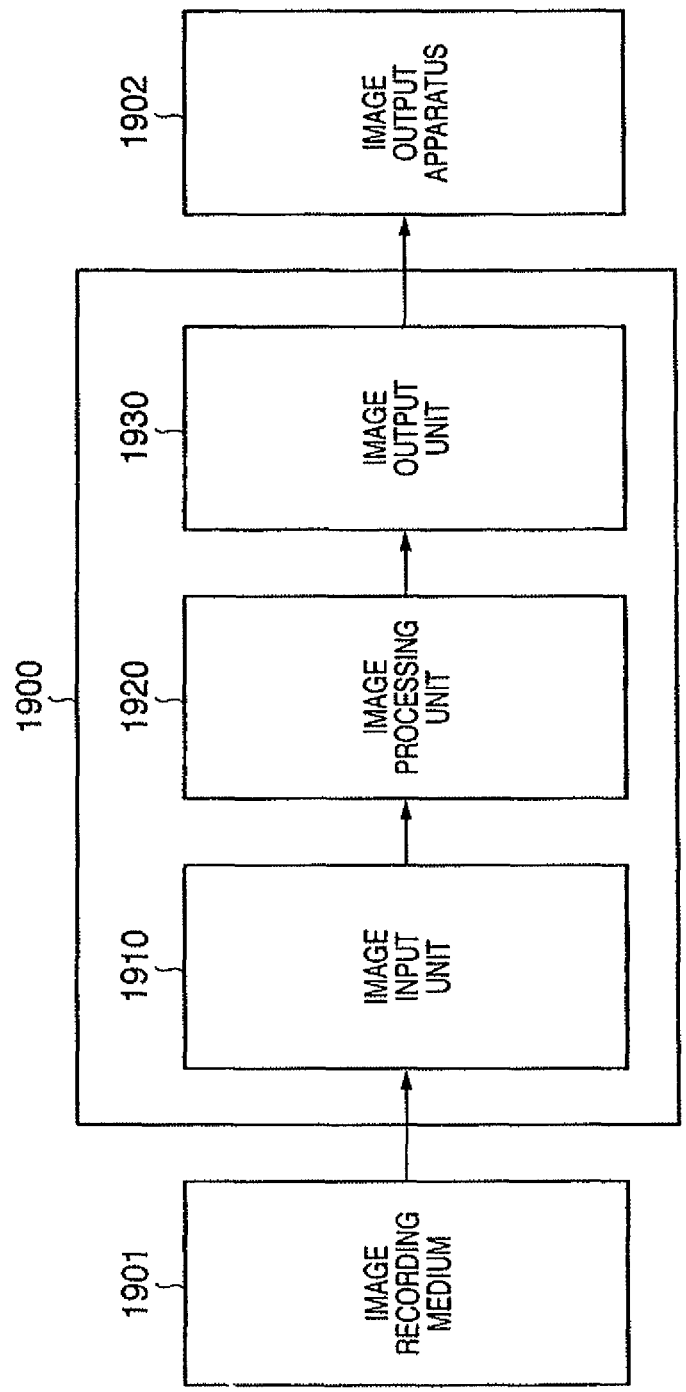
FIG. 19 is a block diagram showing the arrangement of an image processing apparatus and its peripheral devices in the third embodiment.

FIG. 19 is a block diagram showing the arrangement of an image processing apparatus in the third embodiment and its peripheral devices. As shown in FIG. 19, an image processing apparatus 1900 comprises an image input unit 1910, image processing unit 1920, and image output unit 1930. In this arrangement, monochrome image data read from an image recording medium 1901 is input via the image input unit 1910. The image processing unit 1920 converts the input monochrome image data into color signals for an image output apparatus 1902. The image output unit 1930 outputs the converted color signals to the image output apparatus 1902. The image output apparatus 1902 typically comprises a color printer which forms an image on a sheet surface by four, i.e., C, M, Y, and K inks or toners.

<Basic Arrangement>

Figure 20:
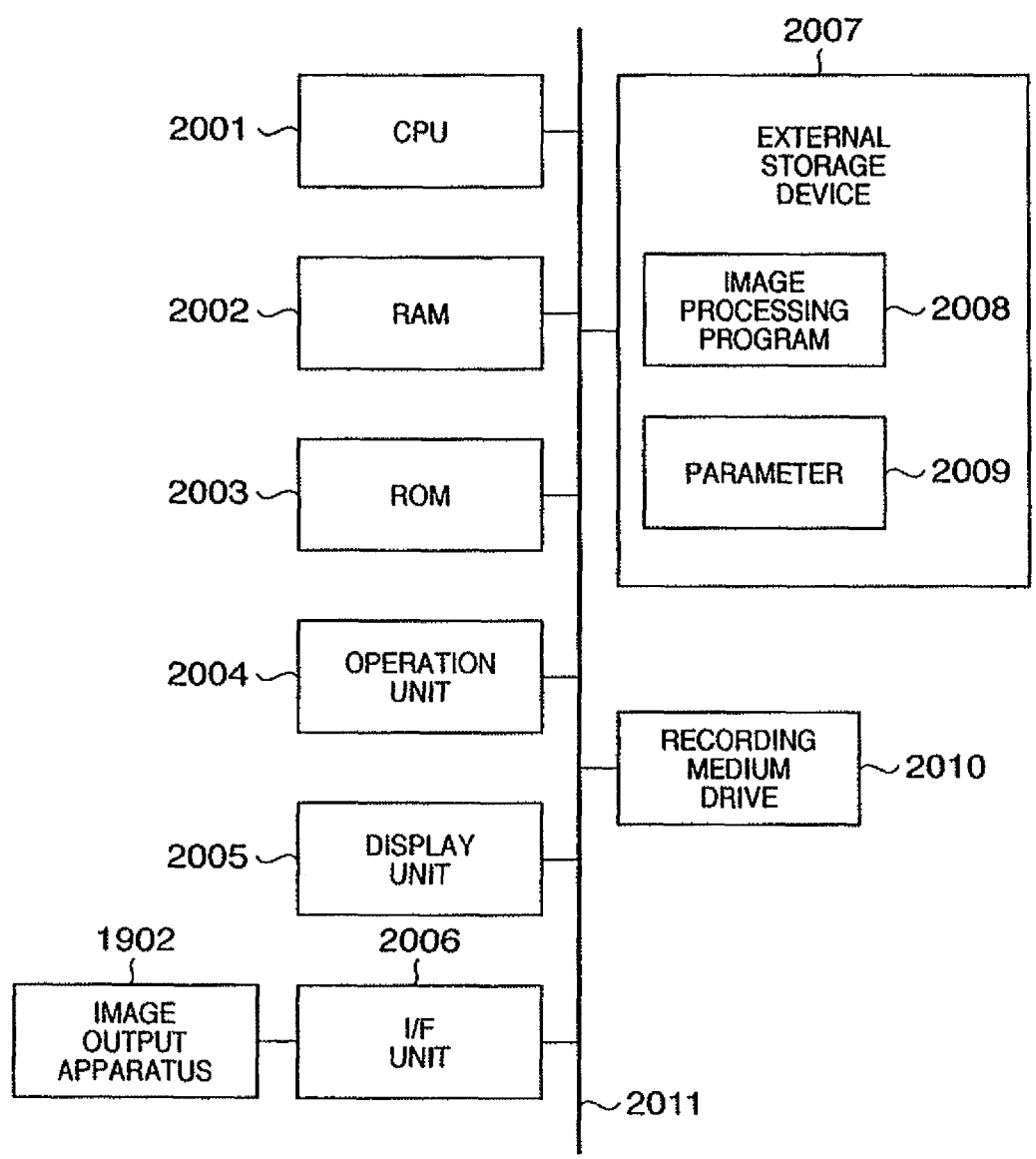
FIG. 20 is a block diagram showing the basic arrangement of an image processing apparatus 1900 in the third embodiment.

FIG. 20 is a block diagram showing the basic arrangement of the image processing apparatus 1900 in the third embodiment. Referring to FIG. 20, reference numeral 2001 denotes a CPU, which controls the overall apparatus using programs and data stored in a RAM and ROM (to be described below), and also executes image processes (to be described later). Reference numeral 2002 denotes a RAM which comprises an area for temporarily storing programs and data loaded from an external storage device or recording medium drive, and various data whose processes are underway, and also a work area used when the CPU 2001 executes respective processes. Reference numeral 2003 denotes a ROM which stores programs and control data, required to control the overall apparatus.

Reference numeral 2004 denotes an operation unit, which comprises a keyboard and a pointing device such as a mouse or the like, and can input color characteristic parameters of the image output apparatus 1902 and an image recording medium (print paper or the like) and a gray tincture adjustment instruction (to be described later) to this apparatus. Reference numeral 2005 denotes a display unit which comprises of, inter alia, a CRT, and liquid crystal display, and displays various adjustment user interfaces (UIs; to be described later), images and text. Reference numeral 2006 denotes an interface (I/F) which connects the image output apparatus 1902 and is used to output data to the image output apparatus 1902. Reference numeral 2007 denotes an external storage device which saves an operating system (OS), and an image processing program 2008 and parameters 2009 required to implement various image processes. Typically, the image processing program 2008 includes a control program of the image output apparatus 1902. Reference numeral 2010 denotes a recording medium drive, which reads various data including image data from the image recording medium 1901, and outputs them to the external storage device 2007 and RAM 2002. Reference numeral 2011 denotes a bus which interconnects the aforementioned units.

<Functional Arrangement>

Figure 21:
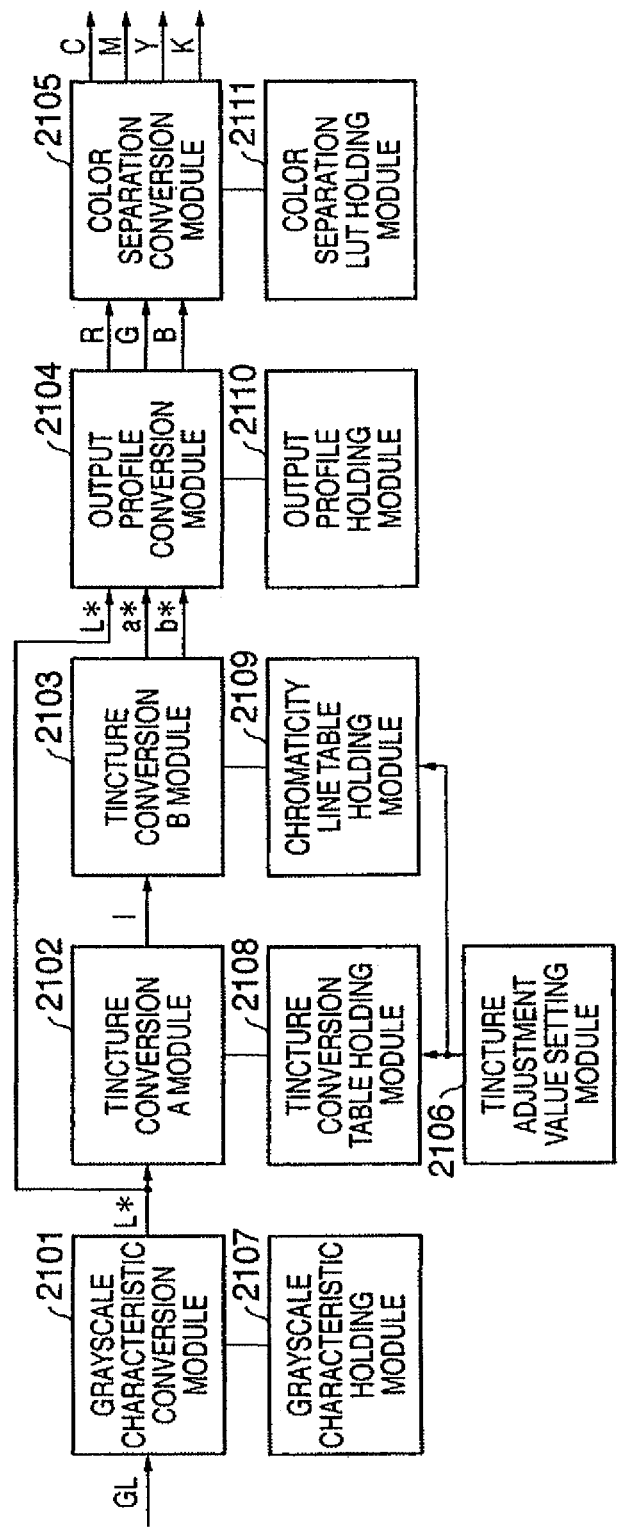
FIG. 21 is a block diagram showing the functional arrangement of an image processing unit 1920 shown in FIG. 19.

FIG. 21 is a block diagram showing the functional arrangement of the image processing unit 1920 shown in FIG. 19. As shown in FIG. 21, the image processing unit 1920 comprises a grayscale characteristic conversion module 2101, tincture conversion A module 2102, tincture conversion B module 2103, output profile conversion module 2104, color separation conversion module 2105, and tincture adjustment value setting module 2106. The image processing unit 1920 converts monochrome signals GL which form an input monochrome image into input C, M, Y, and K color signals for the image output apparatus 1902.

The grayscale characteristic conversion module 2101 converts monochrome signals GL which form an input monochrome image into lightness values L* of a print image, obtained when the monochrome signals GL are outputted by the image output apparatus 1902, on the basis of grayscale characteristics stored in a grayscale characteristic holding module 2107. Note that the grayscale characteristics stored in the grayscale characteristic holding module 2107 are the same as those shown in FIG. 5 explained in the first embodiment, and the relationship between the monochrome signals GL and lightness values L* is also the same as that shown in FIG. 6. Hence, a description thereof will be omitted.

The tincture conversion A module 2102 converts each lightness value L* as an input signal into a distance signal 1 on the chromaticity space on the basis of a tincture conversion table stored in a tincture conversion table holding module 2108. Note that the tincture conversion table stored in the tincture conversion table holding module 2108 is the same as that shown in FIG. 7 described in the first embodiment. Also, the distance signal 1 and the chromaticity point path (gray line), (are) for example the chromaticity point path projected onto the a*b* chromaticity plane on the CIELAB color space, and the relationship between lightness values L* and distance signals 1, which form the tincture conversion table, are the same as those shown in FIGS. 8 and 9, and a description thereof will be omitted.

The tincture conversion B module 2103 converts each distance signal 1 as an input signal into a chromaticity coordinate signal (a*, b*) on the CIELAB color space on the basis of a chromaticity line table stored in a chromaticity line table holding module 2109. Note that the chromaticity line table stored in the chromaticity line table holding module 2109 is the same as that shown in FIG. 10 explained in the first embodiment, and a description thereof will be omitted.

The output profile conversion module 2104 converts input L*, a*, and b* signals into R, G, and B color signals depending on the image output apparatus 1902 on the basis of an output profile stored in an output profile holding module 2110.

FIG. 22 shows an example of the output profile stored in the output profile holding module 2110. This output profile is a correspondence table, that is, a so-called "3D lookup table (LUT)" of print colors (CIELAB values) in association with discrete R, G, and B color signals, and pertains to the color reproduction characteristics of the image output apparatus 1902 and image recording medium (print paper or the like). The output profile conversion module 2104 searches this 3D LUT for data near the input L*, a*, and b* color signals, and calculates output R, G, and B color signals using a known interpolation method on the basis of the found data and the input signals.

The color separation conversion module 2105 converts the input R, G, and B color signals into C, M, Y, and K color signals for the image output apparatus 1902 on the basis of a color separation LUT stored in a color separation LUT holding module 2111.

FIG. 23 shows an example of the color separation LUT stored in the color separation LUT holding module 2111. This color separation LUT is a correspondence table of C, M, Y, and K signals in association with discrete R, G, and B color signals, and pertains to the color reproduction characteristics of the image output apparatus 1902 and image recording medium (print paper or the like). The color separation conversion module 2105 converts input R, G, and B color signals into output C, M, Y, and K color signals by a known method using this color separation LUT.

The tincture adjustment value setting module 2106 sets a gray chromaticity point (point G shown in FIG. 8) and chromaticity point change rate (values associates with 41 and 0 shown in FIG. 9) using tincture adjustment value setting user interfaces (UIs), and sets the tincture conversion table to be stored in the tincture conversion table holding module 2108 and the chromaticity line table to be stored in the chromaticity line table holding module 2109. Note that the tincture adjustment value setting user interfaces (UIs) that are the same as those shown in FIGS. 11 and 12 described in the first embodiment, and a description thereof will be omitted.

In this way, in the third embodiment as well, since the gray chromaticity point and chromaticity point change rate are set, a monochrome print image with a tincture based on user's intention can be obtained.

<Image Processing Sequence>

Figure 24:
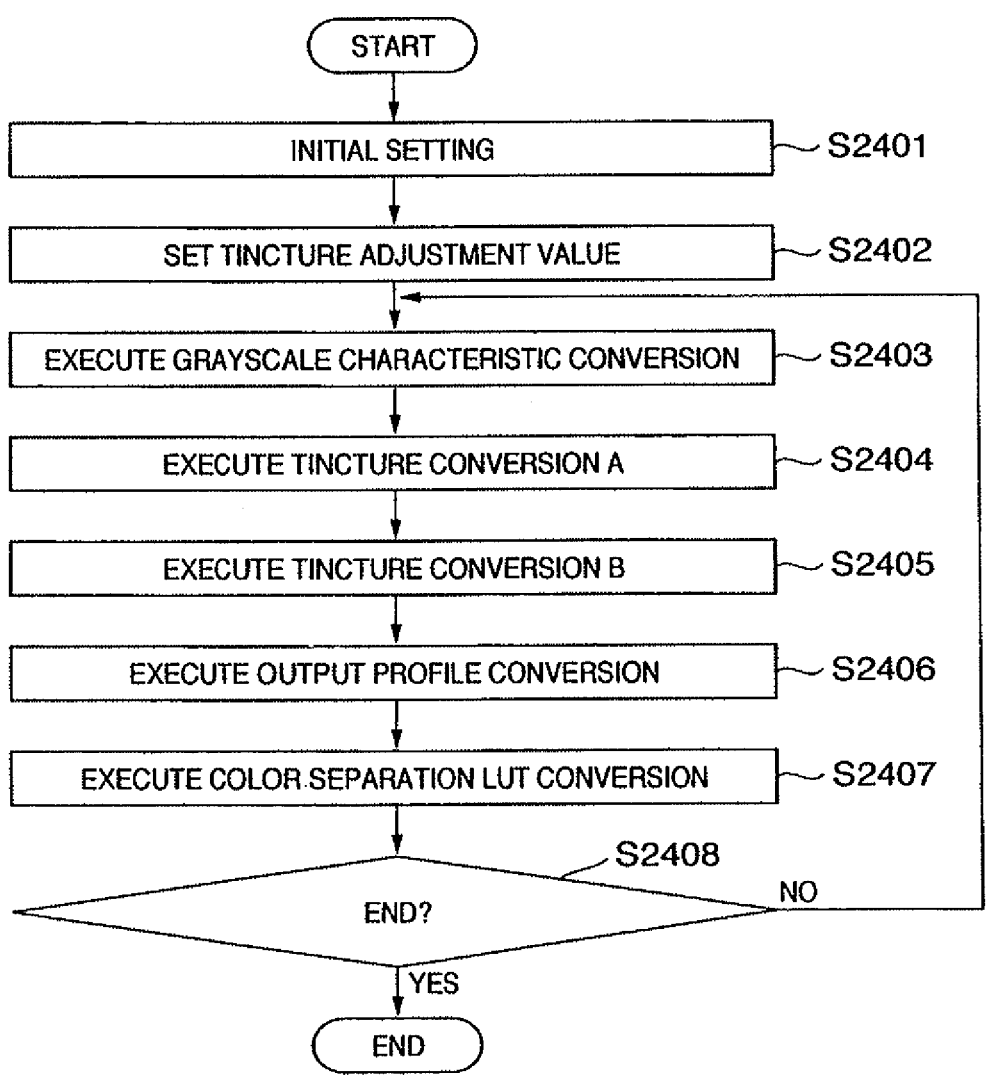
FIG. 24 is a flow chart showing the image processing sequence in the third embodiment.

FIG. 24 is a flow chart showing the image processing sequence according to the third embodiment. This image process is executed in the following sequence.

In step S2401, an initial setting process is made. In the initial setting process, a corresponding output profile and color separation LUT are stored in the output profile holding module 2110 and color separation LUT holding module 2111 in accordance with the image output apparatus 1902 and an image recording medium (print paper or the like). Also, defaulted or designated grayscale characteristics are stored in the grayscale characteristic holding module 2107. Furthermore, an input monochrome image is set.

In step S2402, tincture adjustment values are set. In this tincture adjustment value setting process, a corresponding tincture conversion table and chromaticity line table are respectively stored in the aforementioned tincture conversion table holding module 2108 and chromaticity line table holding module 2109, on the basis of the image output apparatus 1902 and image recording medium (print paper or the like), and the gray chromaticity point and chromaticity point change rate set by the aforementioned tincture adjustment value setting module 2106.

In step S2403, the aforementioned grayscale characteristic conversion module 2101 converts a monochrome signal GL which forms the input monochrome image into a lightness value L*. In step S2404, the aforementioned tincture conversion A module 2102 converts the lightness value L* into a distance function 1. In step S2405, the aforementioned tincture conversion B module 2103 converts the distance function 1 into a chromaticity coordinate signal (a*, b*) on the CIELAB color space.

In step S2406, the output profile conversion module 2104 calculates R, G, and B color signals depending on the image output apparatus 1902 on the basis of the chromaticity coordinate signal (a*, b*) obtained in step S2405 and the lightness value L* obtained in step S2403. In step S2407, the color separation conversion module 2105 converts the R, G, and B color signals obtained in step S2406 into output C, M, Y, and K color signals for the image output apparatus 1902, and outputs the converted signals. It is checked in step S2408 if the processes of all monochrome signals which form the input monochrome image are complete. If signals to be processed still remain, the flow returns to step S2403 to repeat the aforementioned processes.

As described above, according to the third embodiment, the tincture of a monochrome image can be easily adjusted without any tincture changes. More specifically, this embodiment has means for setting a gray chromaticity point and chromaticity point change rate, and sets a gray line on the basis of the setting values. As a result, a monochrome print image with a tincture based on user's intention can be obtained.

[Modification of UI]

A modification of the tincture adjustment value setting user interfaces (UIs) in the first to third embodiments will be described below.

Since the tincture adjustment value setting user interfaces (UIs) explained using FIGS. 11 and 12 have high degrees of freedom, if they are misused, a desired image cannot be obtained, and an unacceptable result may be obtained in the worst case. Hence, a modification of these UIs, which can prevent excessive processes against user's will in adjustment of the tincture of a monochrome image, will be explained. Note that the basic arrangement, functional arrangement, and image processing sequence are the same as those in the third embodiment, and a description thereof will be omitted.

Figure 25:
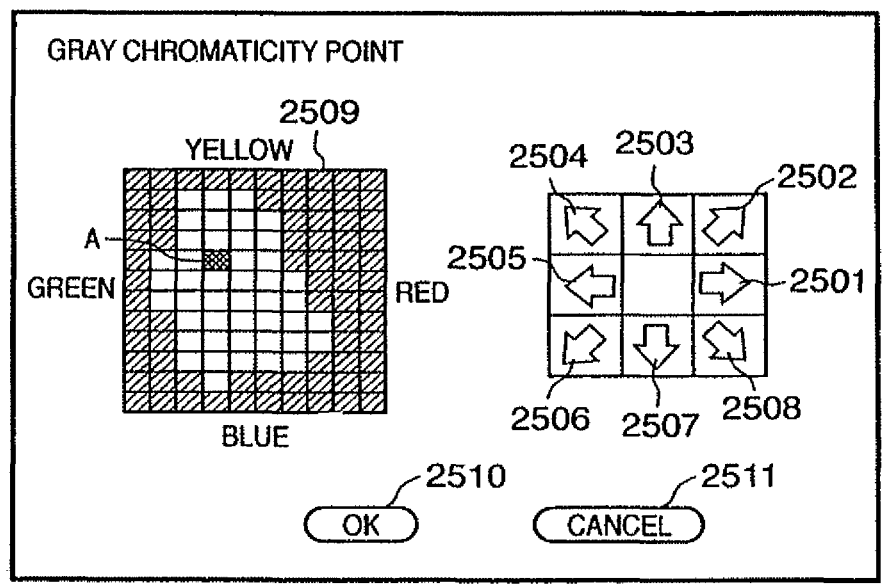
FIG. 25 shows an example of a UI used to set a gray chromaticity point in a modification.

FIG. 25 shows an example of a UI used to set a gray chromaticity point in the modification. As shown in FIG. 25, the UI includes eight tincture setting buttons 2501 to 2508, gray setting map 2509, OK button 2510, and cancel button

2511. Note that the gray setting map 2509 is a grid image corresponding to the a*b* plane of the CIELAB color space, and grid A at a position corresponding to a* and b* of the current gray chromaticity point is indicated by black. The horizontal direction corresponds to the a* axis, and the vertical direction corresponds to the b* axis. When the black grid moves rightward, a tinge of red is enhanced; when it moves upward, a tinge of yellow is enhanced; when it moves leftward, a tinge of green is enhanced; and when it moves downward, a tinge of blue is enhanced.

When the tincture setting button 2501 is selected, the black grid position moves in the right direction to enhance a tinge of red. Likewise, the black grid position moves in the upper right direction upon selection of the tincture setting button 2502; in the upper direction upon selection of the tincture setting button 2503; in the upper left direction upon selection of the tincture setting button 2504; in the left direction upon selection of the tincture setting button 2505; in the lower left direction upon selection of the tincture setting button 2506; in the lower direction upon selection of the tincture setting button 2507; and in the lower right direction upon selection of the tincture setting button 2508. The gray chromaticity point (point G shown in FIG. 8) is then set in a color corresponding to the moved position. By limiting a setting range, an excessive tincture can be prevented from being set.

On the gray setting map 2509, a region outside the setting range is indicated using another color to be distinguished from the setting range. When the black grid position is to be moved outside the setting range by the tincture setting button, an alarm sound is generated to inhibit such movement. When the user selects the OK button 2510, the input chromaticity point is set, and the corresponding chromaticity line table and tincture conversion table are respectively stored in the chromaticity line table holding module 2109 and tincture conversion table holding module 2108. When the user selects the cancel button 2511, the setting value is canceled, and the chromaticity line table and tincture conversion table are not updated. This setting range is determined in accordance with the subjective evaluation results of output images corresponding to respective setting values. For example, when images are output while changing the setting values in an appropriate step, and undergo subjective evaluation, the range of setting values corresponding to images "accepted" by more than half evaluators is determined as the setting range.

FIG. 26 shows an example of a UI used to set a chromaticity point change rate in the modification. As shown in FIG. 26, the UI includes a slide bar 2601 used to set a chromaticity change rate of a highlight part, a slide bar 2602 used to set a chromaticity change rate of a shadow part, an OK button 2603, and a cancel button 2604. By moving the respective slide bars, the values Φ and θ shown in FIG. 9 are increased/decreased, thus setting the chromaticity change rate. For example, when the slide bar 2601 used to set the chromaticity change rate of a highlight part is moved to the right, Φ increases; when it is moved to the left, Φ decreases. At this time, by limiting a setting range, an excessive tincture can be prevented from being set. In the example shown in FIG. 26, the setting range of the slide bar 2601 used to set the chromaticity change rate of a highlight part is limited to a range from B to C. Likewise, the setting range of the slide bar 2602 used to set the chromaticity change rate of a shadow part is limited to a range from D to E.

Upon selection of the OK button 2603, Φ and θ are set on the basis of the slide bar positions, and a corresponding tincture conversion table is stored in the tincture conversion table holding module 2108. Upon selection of the cancel button 2604, setting values are canceled, and the tincture conversion table is not updated. This setting range is determined according to the subjective evaluation results of output images corresponding to respective setting values.

According to the arrangement of the modification, since the setting ranges of the gray chromaticity point and chromaticity point change rate are limited upon setting the tincture of a monochrome image, an excessive process against user's will can be prevented.

[Modification of Third Embodiment]
<Default Value and Setting Range>

Default values and setting ranges of the aforementioned gray chromaticity point and chromaticity point change rate may be set. The default values and setting ranges may be held in correspondence with respective image recording media (print paper or the like). In this case, the tincture adjustment value setting module 2106 in FIG. 21 is used to store these default values and setting ranges.

<Save Setting Value>

The setting values of the gray chromaticity point and chromaticity point change rate may be saved. In such cases, the tincture adjustment value setting module 2106 in FIG. 21 is used to store the setting values. Also, the setting values may be registered in a list, and by selecting a registered setup from the list, setting values corresponding to the selected setup may be re-used.

Note that <default value and setting range> and <save setting value> mentioned above may be applied as modifications of the first and second embodiments in addition to the third embodiment.

<Tincture Conversion A Module>

The aforementioned tincture conversion A module 2102 converts a lightness value L* into a distance signal 1 on the gray line. Alternatively, the tincture conversion A module may convert a monochrome signal GL into a distance signal 1 without temporarily converting it into lightness L*.

Figure 27:
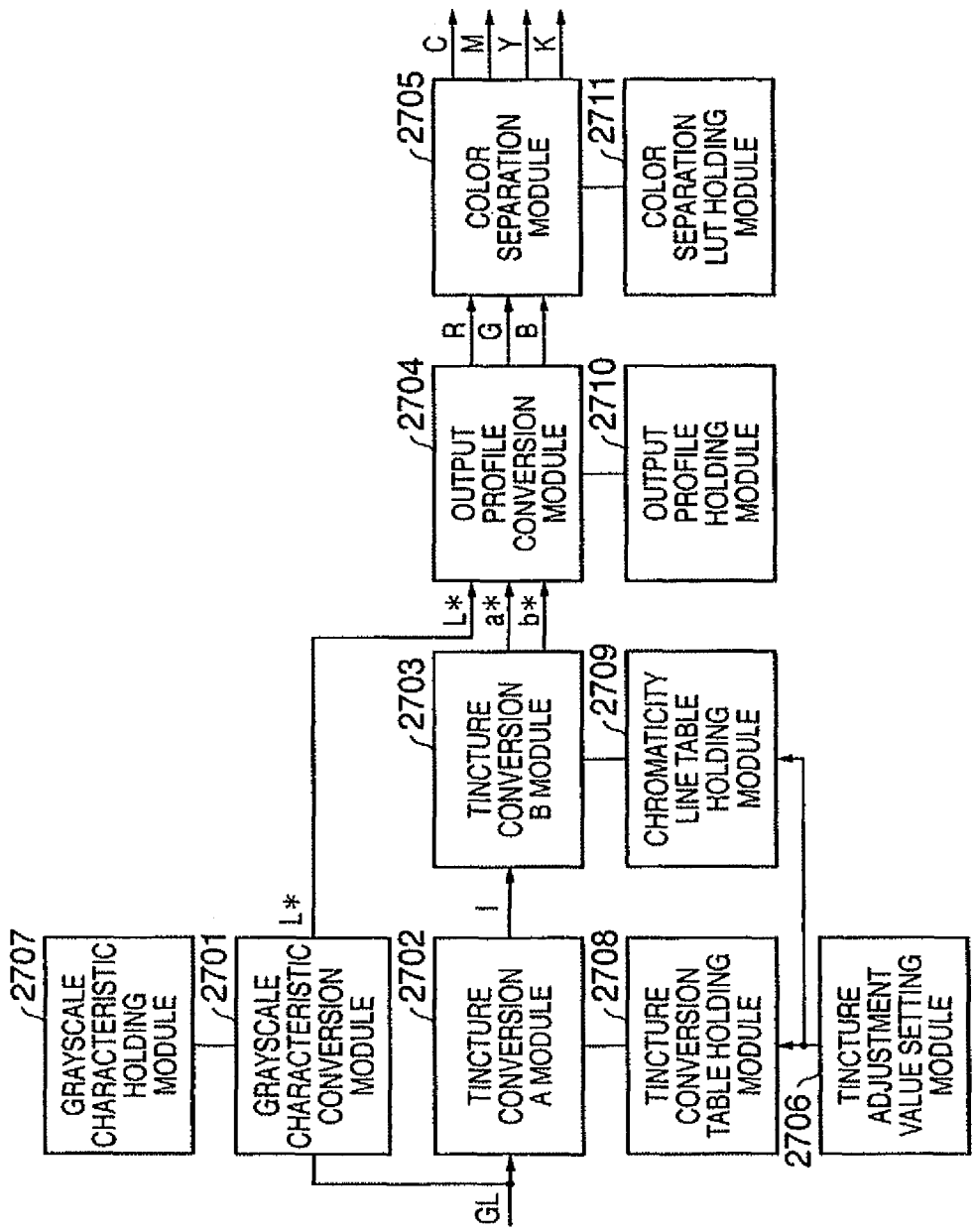
FIG. 27 is a block diagram showing the functional arrangement of an image processing unit in a modification of the third embodiment.

FIG. 27 is a block diagram showing the functional arrangement of an image processing unit in the modification of the third embodiment. As shown in FIG. 27, the image processing unit of this modification comprises of grayscale characteristic conversion module 2701, tincture conversion A module 2702, tincture conversion B module 2703, output profile conversion module 2704, color separation conversion module 2705, and tincture adjustment value setting module 2706. This image processing unit converts monochrome signals GL which form an input monochrome image into input C, M, Y, and K color signals for the image output apparatus 1902.

The tincture adjustment setting module 2706 of this modification sets a change rate of a distance signal 1 in association with a monochrome signal GL, that is, a chromaticity point change rate, using the aforementioned UI, and stores a tincture conversion table corresponding to that change rate in a tincture conversion table holding unit 2708. The tincture conversion A module 2702 converts each monochrome signal GL which forms an input monochrome image into a distance signal 1 on the basis of the tincture conversion table stored in the tincture conversion table holding module 2708. Other functional modules have the have the same functions as those which have the same names in the third embodiment.

According to the modification of the third embodiment, tincture adjustment can be done independently of grayscale conversion.

As described above, according to the third embodiment and its modification, the tincture of a print color can be easily adjusted to be free from any tincture deviation and to obscure tincture changes.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a recording medium, which records a program code of a software program that can implement the functions of the above-mentioned embodiments to the system or apparatus, and reading out and executing the program code stored in the recording medium by a computer (or a CPU or MPU) of the system or apparatus.

In this case, the program code itself reads out from the recording medium implements the functions of the above-mentioned embodiments, and the recording medium which stores the program code constitutes the present invention.

A number of various recording mediums for supplying the program code may be used: for example, a Floppy® disk, hard disk, optical disk, magneto-optical disk, CD-ROM, CD-R, magnetic tape, nonvolatile memory card, and ROM.

The functions of the above-mentioned embodiments may be implemented, not only by executing the readout program code by the computer, but also by some or all of actual processing operations executed by an OS (operating system) running on the computer on the basis of an instruction of the program code.

Furthermore, the functions of the above-mentioned embodiments may be implemented by some or all of the actual processing operations executed by a CPU, or the like, arranged in a function extension board or a function extension unit, which is inserted in or connected to the computer after the program code read out from the recording medium is written in a memory of the extension board or unit.

As described above, according to the above embodiments, a profile used to print a monochrome image with a tincture of user's choice without any color deviation may be generated.

As many apparently widely different embodiments of the present invention may be made without departing from the spirit and scope thereof, it is to be understood that the invention is not limited to the specific embodiments thereof except as defined in the claims.

The invention claimed is:

1. A color process method comprising:
   setting a gray chromaticity point for converting a black and white signal into a monochrome signal having a chromatic tincture, the gray chromaticity point being set by designating a color using a two-dimensional color map in which color thereof changes in both of the two dimensions; and
   converting the black and white signal into the monochrome signal having the chromatic tincture wherein a gray chromaticity point of the monochrome signal having the chromatic tincture matches the set gray chromaticity point,
   wherein, in setting the gray chromaticity point, the designated color is identical to a color corresponding to the set gray chromaticity point, and the set gray chromaticity point controls a color on a gray line in a color plane between a black point of the monochrome signal and the set gray chromaticity point.

2. The method according to claim 1, wherein, in setting the gray chromaticity point, the color is designated based on a user instruction input via a user interface which displays the two-dimensional color map.

3. The method according to claim 1, wherein, in setting the gray chromaticity point, a change rate of the gray chromaticity point can also be set.

4. A color processing apparatus comprising:
   a setting unit constructed to accept a setting for a gray chromaticity point for converting a black and white signal into a monochrome signal having a chromatic tincture, the gray chromaticity point being set by accepting a designation of a color using a two-dimensional color map in which color thereof changes in both of the two dimensions; and
   a conversion unit constructed to convert the black and white signal into the monochrome signal having the chromatic tincture, wherein a gray chromaticity point of the monochrome signal having the chromatic tincture matches the set gray chromaticity point,
   wherein, in setting the gray chromaticity point, the designated color is identical to a color corresponding to the set gray chromaticity point, and the set gray chromaticity point controls a color on a gray line in a color plane between a black point of the monochrome signal and the set gray chromaticity point.

5. The apparatus according to claim 4, wherein, in setting the gray chromaticity point, the color is designated based on a user instruction input via a user interface which displays the two-dimensional color map.

6. The apparatus according to claim 4, wherein, in setting the gray chromaticity point, a change rate of the gray chromaticity point can also be set.

7. A non-transitory computer-readable storage medium storing a computer program for causing a computer to perform a color processing method, the method comprising:
   setting a gray chromaticity point for converting a black and white signal into a monochrome signal having a chromatic tincture, the gray chromaticity point being set by designating a color using a two-dimensional color map in which color thereof changes in both of the two dimensions; and
   converting the black and white signal into the monochrome signal having the chromatic tincture wherein a gray chromaticity point of the monochrome signal having the chromatic tincture matches the set gray chromaticity point,
   wherein, in setting the gray chromaticity point, the designated color is identical to a color corresponding to the set gray chromaticity point, and the set gray chromaticity point controls a color on a gray line in a color plane between a black point of the monochrome signal and the set gray chromaticity point.

* * * * *